(12) United States Patent
Smith et al.

(10) Patent No.: US 11,671,505 B2
(45) Date of Patent: Jun. 6, 2023

(54) ENTERPRISE HEALTH SCORE AND DATA MIGRATION

(71) Applicant: MicroStrategy Incorporated, Vienna, VA (US)

(72) Inventors: Andrew Smith, Oakton, VA (US); Thomas Leuchtner, Oakton, VA (US); Clayton Myers, Oak Hill, VA (US); Herminio Carames, Lansdowne, VA (US); Scott Rowley, Falls Church, VA (US)

(73) Assignee: MicroStrategy Incorporated, Vienna, VA (US)

(*) Notice: Subject to any disclaimer, the term of this patent is extended or adjusted under 35 U.S.C. 154(b) by 0 days.

(21) Appl. No.: 17/406,196

(22) Filed: Aug. 19, 2021

(65) Prior Publication Data

US 2022/0046111 A1 Feb. 10, 2022

Related U.S. Application Data

(63) Continuation of application No. 16/595,330, filed on Oct. 7, 2019, now Pat. No. 11,102,331, which is a
(Continued)

(51) Int. Cl.
*G06F 15/173* (2006.01)
*H04L 67/00* (2022.01)
(Continued)

(52) U.S. Cl.
CPC .......... *H04L 67/34* (2013.01); *H04L 67/1095* (2013.01); *H04L 67/01* (2022.05)

(58) Field of Classification Search
CPC ..... H04L 67/34; H04L 67/1095; H04L 67/42; H04L 41/0813; H04L 43/0817
(Continued)

(56) References Cited

U.S. PATENT DOCUMENTS 5,758,071 A 5/1998 Burgess et al.
6,085,244 A 7/2000 Wookey
(Continued)

OTHER PUBLICATIONS

Abbors et al., "An Automated Approach for Creating Workload Models from Server Log Data," 9th Intl Conf. on Software Engineering and Applications, 2014, pp. 1-12.
(Continued)

*Primary Examiner* — Karen C Tang
(74) *Attorney, Agent, or Firm* — Fish & Richardson P.C.

(57) ABSTRACT

One or more computers receive a request from a user to change a configuration of a computing environment provided by one or more servers. In response to receiving the request and before performing the requested change in the configuration of the environment, the computers determine an estimated measure of performance that represents a level of performance of the computing environment if changed according to the request and provide data indicating performance measures indicating the estimated measure of performance for the environment corresponding to the change in the configuration of the environment. After providing the data indicating the estimated performance measures, the computers receive data indicating user input confirming the request to change the configuration of the environment, and perform the requested change in the configuration of the computing environment.

20 Claims, 16 Drawing Sheets

Related U.S. Application Data continuation of application No. 15/427,675, filed on Feb. 8, 2017, now Pat. No. 10,440,153.

(60) Provisional application No. 62/292,791, filed on Feb. 8, 2016.

(51) Int. Cl.
*H04L 67/1095* (2022.01)
*G06F 15/177* (2006.01)
*H04L 67/01* (2022.01)

(58) Field of Classification Search
USPC .......................................................... 709/224
See application file for complete search history.

(56) References Cited

U.S. PATENT DOCUMENTS

| | | | |
|---|---|---|---|
| 6,282,175 B1 | 8/2001 | Steele et al. | |
| 6,334,158 B1 | 12/2001 | Jennyc et al. | |
| 6,338,149 B1 | 1/2002 | Ciccone, Jr. et al. | |
| 6,339,795 B1 | 1/2002 | Narakar et al. | |
| 6,449,739 B1 | 9/2002 | Landan | |
| 6,473,794 B1 | 10/2002 | Guheen et al. | |
| 6,691,067 B1 | 2/2004 | Ding et al. | |
| 6,691,245 B1 | 2/2004 | DeKoning | |
| 6,792,393 B1 | 9/2004 | Farel et al. | |
| 6,816,871 B2 | 11/2004 | Lee | |
| 6,934,934 B1 | 8/2005 | Baker et al. | |
| 6,964,051 B1 | 11/2005 | Palaniappan | |
| 6,993,747 B1 | 1/2006 | Friedman | |
| 7,024,548 B1 | 4/2006 | O'Toole, Jr. | |
| 7,035,919 B1 | 4/2006 | Eismann et al. | |
| 7,047,177 B1 | 5/2006 | Eismann et al. | |
| 7,051,098 B2 | 5/2006 | Masters et al. | |
| 7,089,347 B2 | 8/2006 | Mogi et al. | |
| 7,155,462 B1 | 12/2006 | Singh et al. | |
| 7,197,559 B2 | 3/2007 | Goldstein et al. | |
| 7,346,676 B1 | 3/2008 | Swildens et al. | |
| 7,389,216 B2 | 6/2008 | Parent et al. | |
| 7,523,447 B1 | 4/2009 | Callahan et al. | |
| 7,552,438 B1 | 6/2009 | Werme et al. | |
| 7,581,011 B2 | 8/2009 | Teng | |
| 7,617,486 B2 | 11/2009 | Sharma et al. | |
| 7,657,871 B2 | 2/2010 | Velupillai | |
| 7,784,049 B1 | 8/2010 | Gandler | |
| 7,802,174 B2 | 9/2010 | Teng et al. | |
| 7,917,617 B1 | 3/2011 | Ponnapur et al. | |
| 7,937,655 B2 | 5/2011 | Teng et al. | |
| 7,996,525 B2 | 8/2011 | Stienhans et al. | |
| 8,024,299 B1 | 9/2011 | Dias et al. | |
| 8,099,727 B2 | 1/2012 | Bahat et al. | |
| 8,219,432 B1 | 7/2012 | Bradley et al. | |
| 8,260,893 B1 | 9/2012 | Bandhole et al. | |
| 8,285,681 B2 | 10/2012 | Prahlad et al. | |
| 8,554,918 B1 | 10/2013 | Douglis | |
| 8,583,769 B1 | 11/2013 | Peters et al. | |
| 8,595,364 B2 | 11/2013 | Levy et al. | |
| 8,595,714 B1 | 11/2013 | Hamer et al. | |
| 8,612,599 B2 | 12/2013 | Tung et al. | |
| 8,732,604 B2 | 5/2014 | Okamoto et al. | |
| 8,805,970 B2 | 8/2014 | Breh et al. | |
| 8,819,171 B2 | 8/2014 | Chakraborty et al. | |
| 8,892,954 B1 | 11/2014 | Gray et al. | |
| 8,903,995 B1 * | 12/2014 | Basak | G06Q 10/06 709/224 |
| 8,990,778 B1 | 3/2015 | Allocca et al. | |
| 9,047,017 B1 | 6/2015 | Dolan et al. | |
| 9,053,220 B2 | 6/2015 | Banks et al. | |
| 9,110,496 B1 | 8/2015 | Michelsen | |
| 9,164,874 B1 | 10/2015 | Tonnay et al. | |
| 9,166,895 B1 | 10/2015 | Sivaraman | |
| 9,189,294 B2 | 11/2015 | Considine et al. | |
| 9,262,150 B2 | 2/2016 | Haserodt et al. | |
| 9,268,663 B1 | 2/2016 | Siddiqui et al. | |
| 9,270,449 B1 | 2/2016 | Tribble et al. | |
| 9,311,161 B2 | 4/2016 | Jagtap | |
| 9,367,305 B1 | 6/2016 | Kumar et al. | |
| 9,424,172 B1 | 8/2016 | Helder | |
| 9,436,535 B2 | 9/2016 | Ricken et al. | |
| 9,491,072 B2 | 11/2016 | Raghunathan et al. | |
| 9,531,604 B2 | 12/2016 | Akolkar et al. | |
| 9,674,294 B1 | 6/2017 | Gonthier et al. | |
| 9,716,624 B2 | 7/2017 | Zeyliger et al. | |
| 9,733,921 B1 | 8/2017 | Saenz et al. | |
| 9,762,450 B2 | 9/2017 | Xie | |
| 9,766,962 B2 | 9/2017 | Dvir et al. | |
| 9,767,312 B2 | 9/2017 | Sahoo et al. | |
| 9,811,849 B2 | 11/2017 | Bursey | |
| 9,820,224 B2 | 11/2017 | Hui et al. | |
| 9,928,210 B1 | 3/2018 | Zhang et al. | |
| 9,959,104 B2 | 5/2018 | Chen et al. | |
| 9,965,261 B2 | 5/2018 | Chen et al. | |
| 9,986,427 B2 | 5/2018 | Kimpe | |
| 10,002,247 B2 | 6/2018 | Suarez et al. | |
| 10,007,509 B1 | 6/2018 | Qureshi et al. | |
| 10,169,023 B2 | 1/2019 | Ciano et al. | |
| 10,191,778 B1 | 1/2019 | Yang et al. | |
| 10,241,778 B2 | 3/2019 | Emeis et al. | |
| 10,244,034 B2 | 3/2019 | Joshi et al. | |
| 10,261,782 B2 | 4/2019 | Suarez et al. | |
| 10,303,455 B2 | 5/2019 | Fitzgerald et al. | |
| 10,310,949 B1 | 6/2019 | Chakraborty et al. | |
| 10,318,280 B2 | 6/2019 | Islam et al. | |
| 10,356,214 B2 | 7/2019 | Joshi et al. | |
| 10,389,582 B1 | 8/2019 | Fakhouri et al. | |
| 10,440,153 B1 | 10/2019 | Smith et al. | |
| 10,452,440 B1 | 10/2019 | Odulinski et al. | |
| 10,474,548 B2 | 11/2019 | Sanakkayala et al. | |
| 10,803,411 B1 | 10/2020 | Smith et al. | |
| 10,810,041 B1 | 10/2020 | Myers et al. | |
| 10,853,111 B1 * | 12/2020 | Gupta | G06F 9/45558 |
| 10,997,052 B2 | 5/2021 | Khosrowpour et al. | |
| 10,997,135 B2 | 5/2021 | Zoll et al. | |
| 11,102,330 B2 | 8/2021 | Gardner et al. | |
| 11,102,331 B2 | 8/2021 | Smith et al. | |
| 11,210,189 B2 | 12/2021 | Myers et al. | |
| 11,283,900 B2 | 3/2022 | Myers et al. | |
| 11,354,216 B2 | 6/2022 | Gardner et al. | |
| 11,360,881 B2 | 6/2022 | Gardner et al. | |
| 11,438,231 B2 | 9/2022 | Gardner et al. | |
| 2002/0065833 A1 | 5/2002 | Litvin | |
| 2002/0122422 A1 | 9/2002 | Kenney et al. | |
| 2002/0124243 A1 | 9/2002 | Broeksteeg et al. | |
| 2002/0157089 A1 | 10/2002 | Patel et al. | |
| 2002/0198985 A1 | 12/2002 | Fraenkel et al. | |
| 2003/0037283 A1 | 2/2003 | Srinivasan et al. | |
| 2003/0135382 A1 | 7/2003 | Marejka et al. | |
| 2004/0060044 A1 | 3/2004 | Das et al. | |
| 2004/0068424 A1 | 4/2004 | Lee et al. | |
| 2006/0059253 A1 * | 3/2006 | Goodman | G06Q 10/10 709/223 |
| 2006/0129870 A1 | 6/2006 | Parent et al. | |
| 2006/0236056 A1 | 10/2006 | Nagata | |
| 2007/0226304 A1 * | 9/2007 | Virk | G06Q 10/107 709/206 |
| 2008/0077366 A1 | 3/2008 | Neuse et al. | |
| 2008/0097960 A1 | 4/2008 | Dias et al. | |
| 2008/0109448 A1 | 5/2008 | Aboel-Nil et al. | |
| 2008/0115195 A1 | 5/2008 | Malek et al. | |
| 2008/0163092 A1 | 7/2008 | Rao | |
| 2008/0243660 A1 | 10/2008 | Amemiya et al. | |
| 2008/0247314 A1 | 10/2008 | Kim et al. | |
| 2008/0301663 A1 | 12/2008 | Bahat et al. | |
| 2009/0018996 A1 | 1/2009 | Hunt et al. | |
| 2009/0063699 A1 | 3/2009 | Chapweske et al. | |
| 2009/0070462 A1 | 3/2009 | Saenz et al. | |
| 2009/0282401 A1 | 11/2009 | Todorova | |
| 2010/0115049 A1 * | 5/2010 | Matsunaga | G06F 9/45558 718/1 |
| 2010/0153780 A1 | 6/2010 | Kirtkow | |
| 2010/0162406 A1 | 6/2010 | Benameur et al. | |
| 2010/0250487 A1 | 9/2010 | Gabriel et al. | |
| 2010/0318986 A1 | 12/2010 | Burke et al. | |

(56) References Cited

U.S. PATENT DOCUMENTS

| | | |
|---|---|---|
| 2011/0054968 A1 | 3/2011 | Galaviz |
| 2011/0055823 A1 | 3/2011 | Nichols et al. |
| 2011/0099290 A1 | 4/2011 | Swildens et al. |
| 2011/0145525 A1 | 6/2011 | Browne et al. |
| 2011/0314344 A1 | 12/2011 | Okamoto et al. |
| 2012/0096149 A1 | 4/2012 | Sunkara et al. |
| 2012/0117620 A1 | 5/2012 | Cassidy |
| 2012/0167094 A1 | 6/2012 | Suit |
| 2012/0198279 A1 | 8/2012 | Schroeder |
| 2012/0246638 A1* | 9/2012 | He .................. G06F 9/45558 718/1 |
| 2012/0310765 A1 | 12/2012 | Masters |
| 2013/0042123 A1 | 2/2013 | Smith et al. |
| 2013/0054792 A1 | 2/2013 | Sharaf |
| 2013/0080514 A1 | 3/2013 | Gupta et al. |
| 2013/0197863 A1 | 8/2013 | Rayate et al. |
| 2013/0297769 A1 | 11/2013 | Chang et al. |
| 2013/0311740 A1 | 11/2013 | Watanabe et al. |
| 2013/0339299 A1 | 12/2013 | Muller et al. |
| 2014/0019387 A1 | 1/2014 | Cao et al. |
| 2014/0020048 A1 | 1/2014 | Snodgrass |
| 2014/0089033 A1 | 3/2014 | Snodgrass |
| 2014/0089505 A1 | 3/2014 | Haserodt et al. |
| 2014/0156839 A1 | 6/2014 | Swildens et al. |
| 2014/0165063 A1 | 6/2014 | Shiva et al. |
| 2014/0201735 A1 | 7/2014 | Kannan et al. |
| 2014/0282456 A1 | 9/2014 | Drost et al. |
| 2014/0331209 A1 | 11/2014 | Singh |
| 2014/0331225 A1 | 11/2014 | Helander et al. |
| 2014/0358944 A1 | 12/2014 | Brower, Jr. et al. |
| 2015/0019195 A1 | 1/2015 | Davis |
| 2015/0019197 A1 | 1/2015 | Higginson |
| 2015/0019488 A1 | 1/2015 | Balch et al. |
| 2015/0019706 A1 | 1/2015 | Raghunathan et al. |
| 2015/0081574 A1 | 3/2015 | Selby et al. |
| 2015/0089479 A1 | 3/2015 | Chen et al. |
| 2015/0095892 A1 | 4/2015 | Baggott et al. |
| 2015/0100829 A1 | 4/2015 | Nanjundappa et al. |
| 2015/0143364 A1* | 5/2015 | Anderson ............. G06F 9/5044 718/1 |
| 2015/0154934 A1 | 6/2015 | Spitzer et al. |
| 2015/0160885 A1* | 6/2015 | Hara .................. G06F 3/067 710/74 |
| 2015/0178052 A1 | 6/2015 | Gupta et al. |
| 2015/0220426 A1 | 8/2015 | Spektor et al. |
| 2015/0242636 A1 | 8/2015 | Khan et al. |
| 2015/0295792 A1 | 10/2015 | Cropper et al. |
| 2015/0326432 A1 | 11/2015 | Fujie et al. |
| 2015/0331715 A1* | 11/2015 | Sathyanarayana ...... H04L 67/10 718/1 |
| 2015/0373097 A1 | 12/2015 | Konkus et al. |
| 2016/0026555 A1 | 1/2016 | Kuo et al. |
| 2016/0044040 A1 | 2/2016 | Caffary, Jr. |
| 2016/0055067 A1 | 2/2016 | Bensinger |
| 2016/0072730 A1 | 3/2016 | Jurban et al. |
| 2016/0132320 A1 | 5/2016 | Fitzgerald et al. |
| 2016/0139887 A1 | 5/2016 | Pudiyapura et al. |
| 2016/0164738 A1 | 6/2016 | Pinski et al. |
| 2016/0277249 A1 | 9/2016 | Singh et al. |
| 2016/0335106 A1 | 11/2016 | Behere et al. |
| 2016/0335108 A1 | 11/2016 | Ryu et al. |
| 2016/0337186 A1 | 11/2016 | Dolinsky et al. |
| 2016/0344610 A1 | 11/2016 | Robinette |
| 2016/0350205 A1 | 12/2016 | Acharya et al. |
| 2016/0371170 A1 | 12/2016 | Salunke et al. |
| 2017/0034023 A1 | 2/2017 | Nickolov et al. |
| 2017/0041201 A1 | 2/2017 | Ilyadis et al. |
| 2017/0061313 A1 | 3/2017 | Oros et al. |
| 2017/0090972 A1 | 3/2017 | Ryu et al. |
| 2017/0147319 A1 | 5/2017 | Riek et al. |
| 2017/0154017 A1 | 6/2017 | Kristiansson et al. |
| 2017/0177860 A1 | 6/2017 | Suarez et al. |
| 2017/0185488 A1 | 6/2017 | Kumarasamy et al. |
| 2017/0270455 A1 | 9/2017 | Chi et al. |
| 2017/0295199 A1 | 10/2017 | Kirti et al. |
| 2017/0300311 A1 | 10/2017 | Lopez et al. |
| 2017/0315795 A1 | 11/2017 | Keller |
| 2018/0013616 A1 | 1/2018 | Abadi et al. |
| 2018/0075086 A1 | 3/2018 | Yam et al. |
| 2018/0088926 A1 | 3/2018 | Abrams |
| 2018/0088935 A1 | 3/2018 | Church et al. |
| 2018/0095778 A1 | 4/2018 | Aydelott et al. |
| 2018/0095973 A1 | 4/2018 | Huang et al. |
| 2018/0136931 A1 | 5/2018 | Hendrich et al. |
| 2018/0157516 A1 | 6/2018 | Kristiansson et al. |
| 2018/0173502 A1 | 6/2018 | Biskup et al. |
| 2018/0173522 A1 | 6/2018 | Hamill et al. |
| 2018/0205652 A1 | 7/2018 | Saxena |
| 2018/0267908 A1 | 9/2018 | Pan et al. |
| 2018/0285199 A1 | 10/2018 | Mitkar et al. |
| 2018/0285210 A1 | 10/2018 | Mitkar et al. |
| 2018/0285246 A1 | 10/2018 | Tuttle et al. |
| 2018/0285353 A1 | 10/2018 | Rao et al. |
| 2018/0287696 A1* | 10/2018 | Barbieri ................ H04W 36/08 |
| 2018/0287902 A1 | 10/2018 | Chitalia et al. |
| 2018/0288129 A1 | 10/2018 | Joshi et al. |
| 2018/0341471 A1 | 11/2018 | Stefanov et al. |
| 2019/0034313 A1 | 1/2019 | Vedurumudi et al. |
| 2019/0050680 A1 | 2/2019 | Waugh et al. |
| 2019/0095254 A1 | 3/2019 | Rao |
| 2019/0102204 A1 | 4/2019 | Khosrowpour et al. |
| 2019/0109822 A1 | 4/2019 | Clark et al. |
| 2019/0109857 A1 | 4/2019 | Caffary, Jr. |
| 2019/0132329 A1 | 5/2019 | Verberkt et al. |
| 2019/0163559 A1 | 5/2019 | Takahashi et al. |
| 2019/0208031 A1 | 7/2019 | Bennet et al. |
| 2019/0213068 A1 | 7/2019 | Upadhyay |
| 2019/0230130 A1 | 7/2019 | Beckman et al. |
| 2019/0235897 A1 | 8/2019 | Goel |
| 2019/0236844 A1 | 8/2019 | Balasian et al. |
| 2019/0260716 A1 | 8/2019 | Lerner |
| 2019/0278669 A1 | 9/2019 | Mueller-Wicke et al. |
| 2019/0288956 A1 | 9/2019 | Pulier et al. |
| 2019/0303541 A1 | 10/2019 | Reddy et al. |
| 2019/0312800 A1 | 10/2019 | Schibler et al. |
| 2019/0317829 A1 | 10/2019 | Brown et al. |
| 2019/0342425 A1 | 11/2019 | Cheng et al. |
| 2019/0354389 A1 | 11/2019 | Du et al. |
| 2019/0392045 A1 | 12/2019 | De Lima Junior et al. |
| 2020/0019393 A1 | 1/2020 | Vichare et al. |
| 2020/0067763 A1 | 2/2020 | Vytla |
| 2020/0081814 A1 | 3/2020 | Srinivasan et al. |
| 2020/0099773 A1 | 3/2020 | Myers et al. |
| 2020/0112624 A1 | 4/2020 | Smith et al. |
| 2020/0119979 A1 | 4/2020 | Woodland et al. |
| 2020/0135264 A1 | 4/2020 | Brady |
| 2020/0177634 A1 | 6/2020 | Hwang et al. |
| 2020/0204465 A1 | 6/2020 | Baker et al. |
| 2020/0249962 A1 | 8/2020 | Vichare et al. |
| 2020/0257612 A1 | 8/2020 | Lang et al. |
| 2020/0272786 A1 | 8/2020 | Pandurangarao et al. |
| 2020/0293436 A1 | 9/2020 | Carames et al. |
| 2020/0356806 A1 | 11/2020 | Li et al. |
| 2020/0366572 A1 | 11/2020 | Chauhan |
| 2020/0394120 A1 | 12/2020 | Salmi et al. |
| 2021/0019321 A1 | 1/2021 | Ehrlich et al. |
| 2021/0042141 A1 | 2/2021 | De Marco et al. |
| 2021/0048995 A1 | 2/2021 | Myers et al. |
| 2021/0048998 A1 | 2/2021 | Myers et al. |
| 2021/0049002 A1 | 2/2021 | Myers et al. |
| 2021/0064262 A1 | 3/2021 | Myers et al. |
| 2021/0064492 A1 | 3/2021 | Myers et al. |
| 2021/0065078 A1 | 3/2021 | Gardner et al. |
| 2021/0067406 A1 | 3/2021 | Myers et al. |
| 2021/0067607 A1 | 3/2021 | Gardner et al. |
| 2021/0073026 A1 | 3/2021 | Myers et al. |
| 2021/0081298 A1 | 3/2021 | Gardner et al. |
| 2021/0089438 A1 | 3/2021 | Gardner et al. |
| 2021/0092015 A1 | 3/2021 | Gardner et al. |
| 2021/0124610 A1 | 4/2021 | Gardner et al. |
| 2022/0171687 A1 | 6/2022 | Myers et al. |
| 2022/0300407 A1 | 9/2022 | Gardner et al. |

(56) References Cited

OTHER PUBLICATIONS doc-archives.microstrategy.com [online], "Installation and Configuration Guide," Sep. 2018, retrieved Mar. 20, 2020, retrieved from URL <https://doc-archives.microstrategy.com/producthelp/10.11/manuals/en/InstallationConfig.pdf>, 527 pages.

doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>, 2 pages.

docs.docker.com [online]. "Get Started, Part 1: Orientation and setup," 2017, retrieved on Oct. 25, 2019, retrieved from URL<https://docs.docker.com/get-started/>, 6 pages.

Dyn.com "Kubernetes: The Difference Between Containers and Virtual Machines," Feb. 2018, retrieved on Oct. 25, 2019, retrieved from URL <https://dyn.com/blog/kubernetes-the-difference-between-containers-and-virtual-machines/>, 8 pages.

Edureka.co [online], "Docker tutorial—Introduction to docker & containerization," 2017, retrieved on Oct. 25, 2019, retrieved from URL <https://www.edureka.co/blog/docker-tutorial>, 10 pages.

GWS Advisory [online], "What's New in Microstrategy 2019", Jan. 2019, retrieved on Oct. 8, 2021, retrieved from URL < https://www.gwsadvisory.com/wp-content/uploads/2019/01/whats-new-in-microstrategy-2019.pdf >, 138 pages.

Kubernetes.io [online],"Concepts underlying the cloud controller manager," May 2019, retrieved on Jun. 20, 2019, retrieved from URL <https://kubernetes.io/docs/concepts/architecture/cloud-controller/>, 9 pages.

Kubernetes.io [online], "StatefulSet is the workload API object used to manage stateful applications," Jun. 2019, retrieved on Jun. 20, 2019, retrieved from URL <https://kubernetes.io/docs/concepts/workloads/controller/statefulset/>, 9 pages.

Linkedin.com [online], "Moving MicroStrategy to a docker/kubernetes infrastructure," Jan. 2018, retrieved from Oct. 25, 2019 retrieved from URL <https://www.linkedin.com/pulse/moving-microstrategy-dockerkubernetes-infrastructure-montero/>, 3 pages.

linuxize.com [online], "How to Remove Docker Containers, Images, Volumes, and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.

Ma et al., "Efficient service handoff across edge servers via docker container migration author:," SEC '17: Proceedings of the Second ACM/IEEE Symposium on Edge Computing, 2017, 11:1-13.

MicroStrategy [online], "MicroStrategy 10.9 Readme", 2017, retrieved on Oct. 5, 2021, 124 pages.

MicroStrategy [online], "System Administration Guide", 2018, retrieved on Oct. 5, 2021, 831 pages.

MicroStrategy [online], "Tools to Upgrade with Confidence", Feb. 4, 2019, retrieved on Oct. 12, 2021, 26 pages.

MicroStrategy [online], "Upgrade Guide—Upgrading your MicroStrategy Enterprise Software", Jun. 2016, retrieved on Oct. 8, 2021, retrieved from URL <https://doc-archives.microstrategy.com/producthelp/10.4/manuals/en/UpgradeGuide.pdf >, 109 pages.

MicroStrategy [online], "Upgrade Guide—Version 10", 2015, retrieved on Oct. 8, 2021, retrieved from URL <https://doc-archives.microstrategy.com/producthelp/10/manuals/en/UpgradeGuide.pdf>, 118 pages.

MicroStrategy [online], "Upgrade Guide—Version 10. 9", Sep. 2017, retrieved on Oct. 8, 2021, retrieved from URL <https://www2.microstrategy.com/producthelp/10.9/manuals/en/UpgradeGuide.pdf, 90 pages.

MicroStrategy [online], "Upgrade Guide—Version 10.11", Jun. 2018, retrieved on Oct. 8, 2021, retrieved from URL <https://www2.microstrategy.com/producthelp/10.11/manuals/en/UpgradeGuide.pdf >, 92 pages.

MicroStrategy.com [online],"Microstrategy on Kubernetes," 2017, retrieved on Oct. 25, 2019, retrieved from URL <https://www.microstrategy.com/getmedia/d99b44dc-ec44-451b-a5a3-3db716028210/Genesys-How-to-run-MicroStrategy-on-Kubernetes>, 10 pages.

Pederson, "Testing SharePoint Apps in Production (Canary Release)," Simon J.K. Pedersen's Azure & Docker blog, 2014, pp. 1-9.

Singh et al., "Container-based microservice architecture for cloud applications," 2017 International Conference on Computing, Communication and Automation (ICCCA), May 2017, pp. 847-852.

Stackoverflow.com [online] "What's the difference between ClusterIP, NodePort and LoadBalancer service types in Kubernetes?" Jan. 2017, retrieved from URL <https://stackoverflow.com/questions/41509439/whats-the-difference-between-clusterip-nodeport-and-loadbalancer-service-types/52241241#52241241>, 6 pages.

Tao et al., "Dynamic Resource Allocation Algorithm for Container-based Service Computing"; 2017 IEEE 13th International Symposium on Autonomous Decentralized Systems—2017 IEEE, 61-67.

Tuton, "Deploy a MongoDB replica set using the IBM Cloud Kubernetes Service," IBM Developer, Mar. 15, 2018, 14 pages.

U.S. Office Action in U.S. Appl. No. 16/556,636, dated Jun. 8, 2021, 7 pages.

U.S. Office Action in U.S. Appl. No. 16/557,482, dated Nov. 30, 2020, 13 pages.

U.S. Office Action in U.S. Appl. No. 16/582,874, dated May 19, 2021, 23 pages.

U.S. Office Action in U.S. Appl. No. 16/582,874, dated Nov. 13, 2020, 21 pages.

U.S. Office Action in U.S. Appl. No. 16/787,596, dated Nov. 25, 2020, 11 pages.

U.S. Office Action in U.S. Appl. No. 17/028,565, dated Oct. 22, 2021, 9 pages.

U.S. Office Action in U.S. Appl. No. 16/542,023, dated Mar. 12, 2021, 15 pages.

U.S. Office Action in U.S. Appl. No. 16/556,636 , dated Aug. 18, 2021, 8 pages.

U.S. Office Action in U.S. Appl. No. 16/582,874 , dated Sep. 16, 2021, 30 pages.

U.S. Office Action in U.S. Appl. No. 17/005,657, dated Dec. 27, 2021, 33 pages.

U.S. Office Action in U.S. Appl. No. 16/557,713, dated Aug. 5, 2021, 39 pages.

U.S. Office Action in U.S. Appl. No. 16/557,713, dated Feb. 24, 2021, 34 pages.

U.S. Office Action in U.S. Appl. No. 16/557,713, dated Nov. 13, 2020, 25 pages.

Wikipedia.org [online], "Docker(software)," Mar. 2013, retrieved on Oct. 25, 2019, retrieved from URL <https://en.wikipedia.org/wiki/Docker_(software)>, 8 pages.

Wikipedia.org [online], "OS-level virtualization," Aug. 2006, retrieved on Oct. 25, 2019, retrieved from URL <https://en.wikipedia.org/wiki/OS-level_virtualization> , 4 pages.

Wikipedia.org [online], "System Image," Feb. 2013, retrieved Oct. 25, 2019, retrieved from URL <https://en.wikipedia.org/wiki/System_image>, 2 pages.

Wong, "What's the Difference Between Containers and Virtual Machines?," Jul. 15, 2016, Electronic Design, retrieved from URL <http://electronicdesign.com/ dev-tools /what-s-difference-between-containers-and-virtualmachines>, 3 pages.

www.en.wikipedia.org [online], "Online Analytical Processing" Mar. 2018, retrieved on Mar. 19, 2020, retrieved from URL <https://en.wikipedia.org/wiki/Online_analytical_processing>. 14 pages.

www2.microstrategy.com [online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>, 2 pages.

www2.microstrategy.com [online], "OperationsManager Guide" 2016, retrieved on Mar. 20, 2020 retrieved from URL <https://www2.microstrategy.com/producthelp/10.4/manuals/en/OperationsManager.pdf>, 154 pages.

Xu et al., "Mining Container Image Repositories for Software Configuration and Beyond," 2018 ACM/IEEE 40th International Conference on Software Engineering: New Ideas and Emerging Results—ICSE-NIER'18, May 27-Jun. 3, 2018, 4 pages.

(56) References Cited

OTHER PUBLICATIONS

Ancillaryinsights[online], "MicroStrategy Analytics Enterprise—Upgrade Guide", 2013, retrieved on Sep. 29, 2021, retrieved from URL <http://ancillaryinsights.com/producthelp/AnalyticsEnterprise/manuals/en/UpgradeGuide.pdf> , 122 pages.

Bedford-computing [online], "JMeter Tutorial", retrieved on Sep. 29, 2021, retrieved from URL < http://bedford-computing.co.uk/learning/wp-content/uploads/2016/03/JMeter-Tutorial.pdf> , 53 pages.

HP [online], "An Introduction to HP LoadRunner software" May 2011, retrieved on Sep. 29, 2021, retrieved from URL <https://www.hp.com/sg-en/pdf/LR_technical_WP_tcm_196_1006601.pdf>, 8 pages.

Jaspersoft [online], "Performance Testing with Jmeter," 2012, retrieved on Sep. 29, 2021, retrieved from URL <https://community.jaspersoft.com/wiki/performance-testing-jmeter>, 4 pages.

Microfocus [online], "LoadRunner and Performance Center," Feb. 2018, retrieved on Sep. 29, 2021, retrieved from URL <https://www.microfocus.com/media/documentation/loadrunner_and_performance_center_document.pdf>, 249 pages.

MicroStrategy [online], "Configuring an upgrade test environment," 2019, retrieved on Sep. 29, 2021, retrieved from URL <https://doc-archives.microstrategy.com/producthelp/11.0/UpgradeGuide/WebHelp/Lang_1033/Content/configuring_an_upgrade_test_environment.htm>, 2 pages.

MicroStrategy [online], "High-level steps to configure an upgrade test environment," 2019, retrieved on Sep. 29, 2021, retrieved from URL <https://doc-archives.microstrategy.com/producthelp/11.0/UpgradeGuide/WebHelp/Lang_1033/content/high_level_steps_to_configure_an_upgrade_test_envi.htm >, 2 pages.

MicroStrategy [online], "Integrity Manager—Upgrade Impact Testing," 2019, retrieved on Sep. 29, 2021, retrieved from URL <https://www2.microstrategy.com/producthelp/2019/UpgradeGuide/en-us/Content/Integrity_testing.htm>, 2 pages.

MicroStrategy [online], "Integrity Manager Homepage," 2019, retrieved on Sep. 29, 2021, retrieved from URL <https://community.microstrategy.com/s/article/Integrity-Manager-Homepage?language=en_US>, 2 pages.

MicroStrategy [online], "KB 16749: What is MicroStrategy Integrity Manager?", 2019, retrieved on Sep. 29, 2021, retrieved from URL <https://community.microstrategy.com/s/article/KB16749-What-is-MicroStrategy-Integrity-Manager?language=en_US >, 2 pages.

MicroStrategy [online], "MicroStrategy Capacity Testing Tool," 2019, retrieved on Sep. 29, 2021, retrieved from URL<https://www2.microstrategy.com/producthelp/2019/UpgradeGuide/en-us/Content/capacity_testing.htm>, 2 pages.

MicroStrategy [online], "MicroStrategy Integrity Manager" 2017, retrieved on Sep. 29, 2021, retrieved from URL <https://doc-archives.microstrategy.com/producthelp/10.4/ProjectDesignGuide/WebHelp/Lang_1033/Content/ProjectDesign/MicroStrategy_Integrity_Manager.htm>, 2 pages.

MicroStrategy [online], "MicroStrategy Upgrade Best Practices" Aug. 2019, retrieved on Sep. 29, 2021, retrieved from URL <https://community.microstrategy.com/s/article/MicroStrategy-Upgrade-Best-Practices?language=en_US>, 2 pages.

MicroStrategy [online], "Perform Basic Stability Testing," 2019, retrieved on Sep. 29, 2021, retrieved from URL <https://doc-archives.microstrategy.com/producthelp/11.0/UpgradeGuide/WebHelp/Lang_1033/Content/perform_basic_stability_testing_on_the_test_server.htm>, 2 pages.

MicroStrategy [online], "The Upgrade Process Checklist," 2019, retrieved on Sep. 29, 2021, retrieved from URL <https://doc-archives.microstrategy.com/producthelp/11.0/UpgradeGuide/WebHelp/Lang_1033/Content/the_upgrade_process_checklist.htm> , 3 pages.

MicroStrategy [online], "Upgrade Analysis Dossier," 2020, retrieved on Sep. 29, 2021, retrieved from URL <https://community.microstrategy.com/s/article/Upgrade-Analysis-Dossier?language~en_US>, 2 pages.

Notice of Allowance in U.S. Appl. No. 17/005,657, dated Dec. 7, 2022, 16 pages.

Tutorialspoint [online], "JMETER—Quick Guide," 2007, retrieved on Sep. 29, 2021, retrieved from URL <https://www.tutorialspoint.com/jmeter/pdf/jmeter_quick_guide.pdf>, 49 pages.

Notice of Allowance in U.S. Appl. No. 16/582,874, dated Jun. 2, 2022, 9 pages.

Notice of Allowance in U.S. Appl. No. 17/555,765, dated Sep. 14, 2022, 9 pages.

Office Action in U.S. Appl. No. 16/582,874, dated Mar. 25, 2022, 26 pages.

Office Action in U.S. Appl. No. 17/005,657, dated May 18, 2022, 45 pages.

Office Action in U.S. Appl. No. 17/028,565, dated Mar. 2, 2022, 8 pages.

\* cited by examiner

| Environment Name | Type | Created on | Version | Machines | Applications | Users |
|---|---|---|---|---|---|---|
| Aqueduct Production | On-Premise | Sep 01, 2015, 10:15 AM | V10.1 | 8 | 3 | 1,289 |
| Aqueduct Test | On-Premise | May 29, 2015, 10:15 AM | V10.1 | 6 | 4 | 280 |
| Aqueduct Development | On-Premise | Jul 25, 2015, 10:15 AM | V10.1 | 6 | 7 | 137 |

Health: 73 RUNNING

Alerts (4):
- System reliability has dropped 40% since 2 weeks ago.
- System capacity has dropped 23% since 2 weeks ago.
- Performance of Dossier2 has reached threshold.
- Performance of Dashboard1 has reached threshold.

Sidebar:
- Enterprise
- Environments
- Applications
- Data Sources
- Directories
- All
- Documents
- Dossiers
- Dashboards
- Reports
- Forms
- Charts
- Maps Workstation

500

| Enterprise | On-Premises Environments | | |
|---|---|---|---|
| Environments ⊕ | Aqueduct Production  3 | Aqueduct Test  4 | Aqueduct Development  7 |
| ⊞ Applications | ✚ Merit | ✚ Merit | ✚ Merit |
| 🗎 Data Sources | ✚ Human Resource | ✚ Human Resource | ✚ Finance |
| ☐ Directories | ✚ Finance | ✚ Finance | ✚ Sales |
| ⋮ All | | ✚ Technology | ✚ APAC |
| Documents | | | |
| ◆ Dossiers | Cloud Environment | | |
| ▥ Dashboards | Cloud Production  0 | | |
| ▪ Reports | | | |
| ▪ Forms | | | |
| 🌐 Charts | | | |
| 🌐 Maps | | | |
| ▦ Grids | | | |
| Analyticals | | | |
| ▽ Filters | | | |
| ⊘ Objects | | | |
| ⋔ Models | | | |
| Security | | | |
| ▲ Users | | | |
| ▣ Badges | | | |
| Others | | | |

| Cloud Production Machines | | | | | |
|---|---|---|---|---|---|
| Machine Name | Machine Address | CPU Used | Memory Used | Disk Used | Fenced User |
| ▽ ☐ cloud-07-135 | 230.193.10.31 | 12% | 9% | 18% | ▲ x2 |
| Analytic Service | | 8% | 4% | 10% | ▲ Merit ▲ Finance |
| Security Service | | 2% | 3% | 6% | |
| Messaging Service | | 2% | 2% | 2% | |
| ▽ ☐ cloud-07-137 | 259.89.289.98 | 12% | 23% | 13% | ▲ x2 |
| Analytic Service | | 7% | 18% | 6% | |
| Distribution Service | | 2% | 2% | 6% | |
| Web Service | | 3% | 3% | 1% | |
| ▽ ☐ cloud-07-138 | 204.90.221.90 | 56% | 54% | 57% | ▲ x1 |
| Recommendation Service | | 30% | 22% | 46% | |
| Exporting Service | | 26% | 32% | 21% | |
| ▽ ☐ cloud-07-139 | 194.355.25.21 | 39% | 30% | 47% | ▲ x1 |
| Analytic Service | | 21% | 16% | 35% | |
| Search Service | | 18% | 14% | 12% | |
| ▽ ☐ cloud-07-145 | 284.984.294.2 | 24% | 22% | 23% | ▲ x2 |
| Mobility Service | | 8% | 12% | 9% | |
| Analytic Service | | 16% | 10% | 14% | |

FIG. 12

| Cloud Production Machines | | | | | |
|---|---|---|---|---|---|
| Machine Name | Machine Address | CPU Used | Memory Used | Disk Used | Fenced User |
| ▼ ▫ cloud-07-135 | 230.193.10.31 | 12% | 9% | 18% | ᴀx2 |
| Analytic Service | | 8% | 4% | 10% | |
| Security Service | | 2% | 3% | 6% | |
| Messaging Service | | 2% | 2% | 2% | |
| ▽ ▫ cloud-07-137 | 259.89.289.98 | 12% | 23% | 13% | ᴀx2 |
| Analytic Service | | 7% | 18% | 6% | |
| Distribution Service | | 2% | 2% | 6% | |
| Web Service | | 3% | 3% | 1% | |
| ▼ ▫ cloud-07-138 | 204.90.221.90 | 56% | 54% | 57% | ᴀx1 |
| Recommendation Service | | 30% | 22% | 46% | Restart |
| Exporting Service | | 26% | 32% | 21% | Machine Information / Fence Users |
| ▽ ▫ cloud-07-139 | 194.355.25.21 | 39% | 30% | 47% | ᴀx1 |
| Analytic Service | | 21% | 16% | 35% | |
| Search Service | | 18% | 14% | 12% | |
| ▽ ▫ cloud-07-145 | 284.984.294.2 | 24% | 22% | 23% | ᴀx2 |
| Mobility Service | | 8% | 12% | 9% | |
| Analytic Service | | 16% | 10% | 14% | |

FIG. 13

Enterprise

- ☰ Environments ⊕
  - 🖼 Applications
  - 🗐 Data Sources
  - ☐ Directories
  - ∴ All
- Documents
  - ◆ Dossiers
  - 📊 Dashboards
  - ▤ Reports
  - ■ Forms
  - ● Charts
  - ◉ Maps
  - ▦ Grids
- Analytics
  - ▽ Filters
  - ✪ Objects
  - ♣ Models
- Security
  - 👤 Users
  - 🛡 Badges
- Others
  - 🖼 Media
  - ▣ Styles
- Logic
  - △ Alerts
  - ⊕ Schedules
  - 📜 Scripts
  - ← Workflows

[Last Updated ▽] [⎕]    Workstation    [🔍 Search]

📀 Cloud Production Machines    8 Machines  3 Applications

| Machine Name | Machine Address | CPU Used | Memory Used | Disk Used | Fenced User |
|---|---|---|---|---|---|
| ▽ ☐ cloud-07-135 | 230.193.10.31 | 12% | 9% | 18% | ( CXO Group x )  🔳x2 |
| Analytic Service | | 8% | 4% | 10% | |
| Security Service | | 2% | 3% | 6% | |
| Messaging Service | | 2% | 2% | 2% | |
| ▽ ☐ cloud-07-137 | 259.89.289.98 | 12% | 23% | 13% | 🔳x2 |
| Analytic Service | | 7% | 18% | 6% | |
| Distribution Service | | 2% | 2% | 6% | |
| Web Service | | 3% | 3% | 1% | |
| ▽ ☐ cloud-07-138 | 204.90.221.90 | 56% | 54% | 57% | ( CXO Group x )  🔳x1 |
| Recommendation Service | | 30% | 22% | 46% | |
| Exporting Service | | 26% | 32% | 21% | |
| ▽ ☐ cloud-07-139 | 194.355.25.21 | 39% | 30% | 47% | 🔳x1 |
| Analytic Service | | 21% | 16% | 35% | |
| Search Service | | 18% | 14% | 12% | |
| ▽ ☐ cloud-07-145 | 284.984.294.2 | 24% | 22% | 23% | 🔳x2 |
| Mobility Service | | 8% | 12% | 9% | |
| Analytic Service | | 16% | 10% | 14% | |

FIG. 15

ENTERPRISE HEALTH SCORE AND DATA MIGRATION

CROSS-REFERENCE TO RELATED APPLICATIONS

This application is a continuation of U.S. application Ser. No. 16/595,330, filed Oct. 7, 2019, now allowed, which is a continuation of U.S. application Ser. No. 15/427,675, filed Feb. 8, 2017, now U.S. Pat. No. 10,440,153, issued Oct. 8, 2019, which claims the benefit of U.S. Provisional Application Ser. No. 62/292,791, filed on Feb. 8, 2016. All of these prior applications are incorporated by reference in their entirety.

FIELD

This specification generally relates to enterprise data management.

BACKGROUND

As the volume of data utilized by user devices and across an enterprise increases, improved methods for movement and manipulation of data across multiple platforms and devices are desired to provide greater system efficiency and improved user experience.

SUMMARY

According to implementations, a system and method for configuring various platforms of a unified, multi-platform enterprise system is described. When a request to manipulate a data object from one platform or category to another platform or category is received, resources connected to the data object may be retrieved and a simulation of the unified, multi-platform enterprise system can be executed to determine the likely performance of the unified, multi-platform enterprise system after the data object is reconfigured, e.g., assigned to be served by a different server in the enterprise. Health scores for the unified, multi-platform enterprise system or a particular platform or category may be generated based on the simulation. A user can decide based on the health scores whether the user would like to proceed with the requested change or to terminate the request. If the user would like to proceed with the requested change, the resources associated with the data object may be copied or reconfigured so that the data object can operate or be executed in the destination platform or category.

These and other techniques enable a user to remotely configure many types of applications, documents, and other elements of an enterprise computing system. For example, a user can instruct the system to assign an application or document to be served in a particular computing environment, e.g., a particular grouping of servers, which may be designated for a particular purpose or task. The system can then identify metadata, data sources, resource dependencies, and other needs of the selected application or document, and automatically configure the particular computing environment to support the selected application or document.

In general, one aspect of the subject matter described in this specification may include a computer-implemented method including operations of receiving, by the one or more computers, a request from a user to change a configuration of a computing environment provided by one or more servers, in response to receiving the request and before performing the requested change in the configuration of the environment: determining, by the one or more computers, an estimated measure of performance that represents a level of performance of the computing environment if changed according to the request, and providing, by the one or more computers, data indicating performance measures indicating the estimated measure of performance for the environment corresponding to the change in the configuration of the environment. After providing the data indicating the estimated performance measures, the computers receive data indicating user input confirming the request to change the configuration of the environment, and perform the requested change in the configuration of the computing environment.

In some implementations, receiving the request from the user to change a configuration of the computing environment includes receiving an input instructing the one or more computers to copy or move one or more objects from a first computing environment to a second computing environment.

In some implementations, receiving the request from the user to change a configuration of the computing environment includes: receiving an indication that a drag and drop operation has been executed, in which one or more respective representations of the one or more objects are dragged from a representation of the first computing environment and dropped to a representation of the second computing environment in the drag and drop operation, or receiving an indication that a copy and paste operation has been executed, one or more respective representations of the one or more objects being copied from a representation of the first computing environment and placed a representation of the second computing environment in the copy and paste operation.

In some implementations, the first computing environment is a first computing environment provided by a first server system and the second computing environment is a second computing environment provided by a second server system, wherein the second server system is different from the first server system.

In some implementations, the operations further include determining one or more assets associated with the one or more objects, and executing migration of the one or more objects from the first computing environment to the second computing environment, the migration of the one or more objects form the first computing environment to the second computing environment including configuring the one or more assets associated with the one or more objects for the second computing environment.

In some implementations, the one or more assets associated with the one or more objects includes one or more of: a metadata model associated with the object, data indicative of users associated with the object, data structures associated with the object, and data sources associated with object.

In some implementations, configuring the one or more assets associated with the one or more objects for the second computing environment includes: copying the one or more assets from the first computing environment to the second computing environment, or reconfiguring the one or more assets to operate in the second computing environment.

In some implementations, the operations further include one or more of: determining a category or subcategory of the object, determining a file type of the object, determining a programming language used to program the object, and determining an identification feature of the object.

In some implementations, the operations further include generating an alert based on the estimated performance measure of the computing environment corresponding to the second computing environment, the alert including: a first alert indicating: (i) that the computing environment corresponding to the second computing environment is predicted to be impacted negatively by the object migration by less than a threshold amount, and (ii) a proceed with caution message indicating that a user should proceed with the object migration with caution, a second alert indicating that: (i) the computing environment corresponding to the second computing environment is predicted to be impacted negatively by the object migration by more than a threshold amount, and (ii) the object cannot be migrated without system administrator approval, or a third alert indicating that: (i) the computing environment corresponding to the second computing environment is predicted to be harmed by the object migration, and (ii) the object migration cannot be completed, and transmitting the alert to a user device.

In some implementations, the one or more objects include a server-hosted application, determining one or more assets associated with the one or more objects includes determining users, application settings, data source connections, and object definitions associated with the server-hosted application, and executing migration includes migrating the determined users, application settings, data source connections, and object definitions associated with the server-hosted application to the second computing environment.

In some implementations, the estimated performance measure includes data indicative of one or more of a response time of the object, a reliability of the second computing environment, data processing speed of the second computing environment, data processing capacity of the second computing environment, available storage in the second computing environment, user capacity of the second computing environment, security status of the second computing environment, and network connectivity of the second computing environment.

In some implementations, another aspect of the disclosed subject matter includes a computer-readable storage medium storing instructions executable by one or more computers which, upon such execution, cause the one or more computers to perform operations including: receiving, by the one or more computers, a request from a user to change a configuration of a computing environment provided by one or more servers, in response to receiving the request and before performing the requested change in the configuration of the environment: determining, by the one or more computers, an estimated measure of performance that represents a level of performance of the computing environment if changed according to the request, and providing, by the one or more computers, data indicating performance measures indicating the estimated measure of performance for the environment corresponding to the change in the configuration of the environment. After providing the data indicating the estimated performance measures, the one or more computers receive data indicating user input confirming the request to change the configuration of the environment, and perform the requested change in the configuration of the computing environment.

In some implementations, receiving the request from the user to change a configuration of the environment provided by the one or more servers includes receiving an input to copy or move one or more objects from a first computing environment to a second computing environment.

In some implementations, receiving the request from the user to change a configuration of the environment provided by the one or more servers includes: receiving an indication that a drag and drop operation has been executed, one or more respective representations of the one or more objects dragged from a representation of the first computing environment and dropped to a representation of the second computing environment in the drag and drop operation, or receiving an indication that a copy and paste operation has been executed, one or more respective representations of the one or more objects being copied from a representation of the first computing environment and placed a representation of the second computing environment in the copy and paste operation.

In some implementations, the first computing environment is a first computing environment provided by a first server system and the second computing environment is a second computing environment provided by a second server system, wherein the second server system is different from the first server system.

In some implementations, the operations further include determining one or more assets associated with the one or more objects, and executing migration of the one or more objects from the first computing environment to the second computing environment, the migration of the one or more objects form the first computing environment to the second computing environment including configuring the one or more assets associated with the one or more objects for the second computing environment.

In some implementations, the one or more assets associated with the one or more objects includes one or more of: a metadata model associated with the one or more objects, data indicative of users associated with the one or more objects, data structures associated with the one or more objects, and data sources associated with the one or more objects.

In some implementations, another aspect of the disclosed subject matter includes a system that includes one or more computers and one or more storage devices storing instructions that upon execution by the one or more computers, cause the one or more computers to perform operations. The operations include receiving, by the one or more computers, a request from a user to change a configuration of a computing environment provided by one or more servers, in response to receiving the request and before performing the requested change in the configuration of the environment: determining, by the one or more computers, an estimated measure of performance that represents a level of performance of the computing environment if changed according to the request, and providing, by the one or more computers, data indicating performance measures indicating the estimated measure of performance for the environment corresponding to the change in the configuration of the environment. After providing the data indicating the estimated performance measures, the one or more computers receive data indicating user input confirming the request to change the configuration of the environment, and perform the requested change in the configuration of the computing environment.

In some implementations, receiving the request from the user to change a configuration of the environment provided by the one or more servers includes receiving an input to copy or move one or more objects from a first computing environment to a second computing environment.

In some implementations, the first computing environment is a first computing environment provided by a first server system and the second computing environment is a second computing environment provided by a second server system, wherein the second server system is different from the first server system.

In general, another aspect of the subject matter described in this specification may include a computer-implemented method including operations of receiving an input to copy or move one or more objects from a first computing environment to a second computing environment, determining one or more assets associated with the one or more objects, and determining a likely performance of an environment corresponding to the second computing environment when the one or more objects are to be copied or moved to the second computing environment. The likely performance of the environment corresponding to the second computing environment including a likely health score of the environment corresponding to the second computing environment. The operations further include providing data indicating performance measures indicating the likely performance of the environment corresponding to the second computing environment, receiving data indicating user input confirming the operation to copy or move the one or more objects from the first computing environment to the second computing environment after providing the data indicating the performance measures, and executing migration of the one or more objects from the first computing environment to the second computing environment. The migration of the one or more objects from the first computing environment to the second computing environment includes configuring the one or more assets associated with the one or more objects for the second computing environment.

In some implementations, the receiving the input to copy or move one or more objects from the first computing environment to the second computing environment includes receiving an indication that a drag and drop operation has been executed or receiving an indication that a copy and paste operation has been executed. In the drag and drop operation, the one or more respective representations of the one or more objects are dragged from a representation of the first computing environment and dropped to a representation of the second computing environment. In the copy and paste operation, one or more respective representations of the one or more objects are copied from a representation of the first computing environment and placed a representation of the second computing environment.

In some implementations, the one or more assets associated with the one or more objects include one or more of a metadata model associated with the object, data indicative of users associated with the object, data structures associated with the object, and data sources associated with object.

In some implementations, the operations further include one or more of determining a category or subcategory of the object; determining a file type of the object; determining a programming language used to program the object; and determining an identification feature of the object.

In some implementations, the likely health score of the second environment includes data indicative of one or more of a response time of the object, a reliability of the second environment, data processing speed of the second environment, data processing capacity of the second environment, available storage in the second environment, user capacity of the second environment, security status and indicators of the second environment, and network connectivity and performance of the second environment.

In some implementations, the operations further include generating an alert based on the determined likely performance of the environment corresponding to the second computing environment and transmitting the alert to a user device. The alert includes one of: a first alert indicating: (i) that the environment corresponding to the second computing environment is predicted to be impacted negatively by the object migration by less than a threshold amount, and (ii) a proceed with caution message indicating that a user should proceed with the object migration with caution; a second alert indicating that: (i) the environment corresponding to the second computing environment is predicted to be impacted negatively by the object migration by more than a threshold amount, and (ii) the object cannot be migrated without system administrator approval; and a third alert indicating that: (i) the environment corresponding to the second computing environment is predicted to be harmed by the object migration, and (ii) the object migration cannot be completed.

In some implementations, the configuring of the one or more assets associated with the one or more objects for the second computing environment includes copying the one or more assets from the first computing environment to the second computing environment, or reconfiguring the one or more assets to operate in the second computing environment.

In some implementations, the one or more objects comprise a server-hosted application. The determining one or more assets associated with the one or more objects includes determining users, application settings, data source connections, and object definitions associated with the server-hosted application. The executing migration includes migrating the determined users, application settings, data source connections, and object definitions associated with the server-hosted application to the second computing environment.

Other features may include corresponding systems, apparatus, and computer programs encoded on computer storage devices configured to perform the foregoing actions.

The subject matter described in this specification can be implemented in particular embodiments so as to realize one or more of the following advantages. The disclosed techniques can provide real-time and historical trend data on performance metrics for a system migration by using benchmarks for the current system and projecting performance for the migrated system with known characteristics of the migrated system. The method provides users with a snapshot of the estimated performance of a migrated system and allows users to make informed decisions regarding their computing needs and to effectively manage their resources. The techniques can improve the reliability of computer systems by anticipating potential errors or decreases in responsiveness. For example, the system can monitor the number of users assigned to a server, the storage space available for the server, and other factors, and determine when available resources are insufficient to maintain a particular level of performance (e.g., responsiveness or throughput) for the expected demand.

The disclosed method allows users to customize performance reports and focus computing resources on monitoring resources that are crucial for a specific use case. When available computing resources are not sufficient for the enterprise, newly generated environments can be established by the system. For example, the system allows a user to migrate data and tasks to different environments, including existing environments or environments that are created by the system. This migration can be done at a fine-grained level, allowing the system to migrate specific applications, documents, or data to be served by a specific environment. The system also enables users to specific users, or specific groups of users, to be served by particular server environments, allowing computing resources to be managed more efficiently. For example, users with high demands on the server can be assigned to specific servers or environments within the enterprise computing system to avoid impacting other users. As another example, the system can dedicate specific resources to certain prioritized users or departments in an organization to ensure that a high level of performance is consistently available, regardless of other demands on the computing system.

The details of one or more implementations are set forth in the accompanying drawings and the description, below. Other features will be apparent from the description and drawings, and from the claims.

DESCRIPTION OF DRAWINGS

FIG. 2 illustrates a screenshot of a graphical user interface (GUI) to access the unified, multi-platform enterprise system.

FIG. 5 is an exemplary illustration of system performance alerts.

FIG. 9 is an exemplary illustration of a GUI displaying an indicator of a cloud-based environment.

FIG. 11 is an exemplary illustration of a tasks and status indicator for a drag-drop operation to drop objects in a cloud-based environment.

FIG. 12 is an exemplary illustration of GUI providing information regarding computers in a cloud-based environment.

FIG. 13 is an exemplary illustration of an operation to fence users.

FIG. 15 is an exemplary illustration of an operation to fence users.

Like reference numbers and designations in the various drawings indicate like elements.

DETAILED DESCRIPTION

Figure 1A:
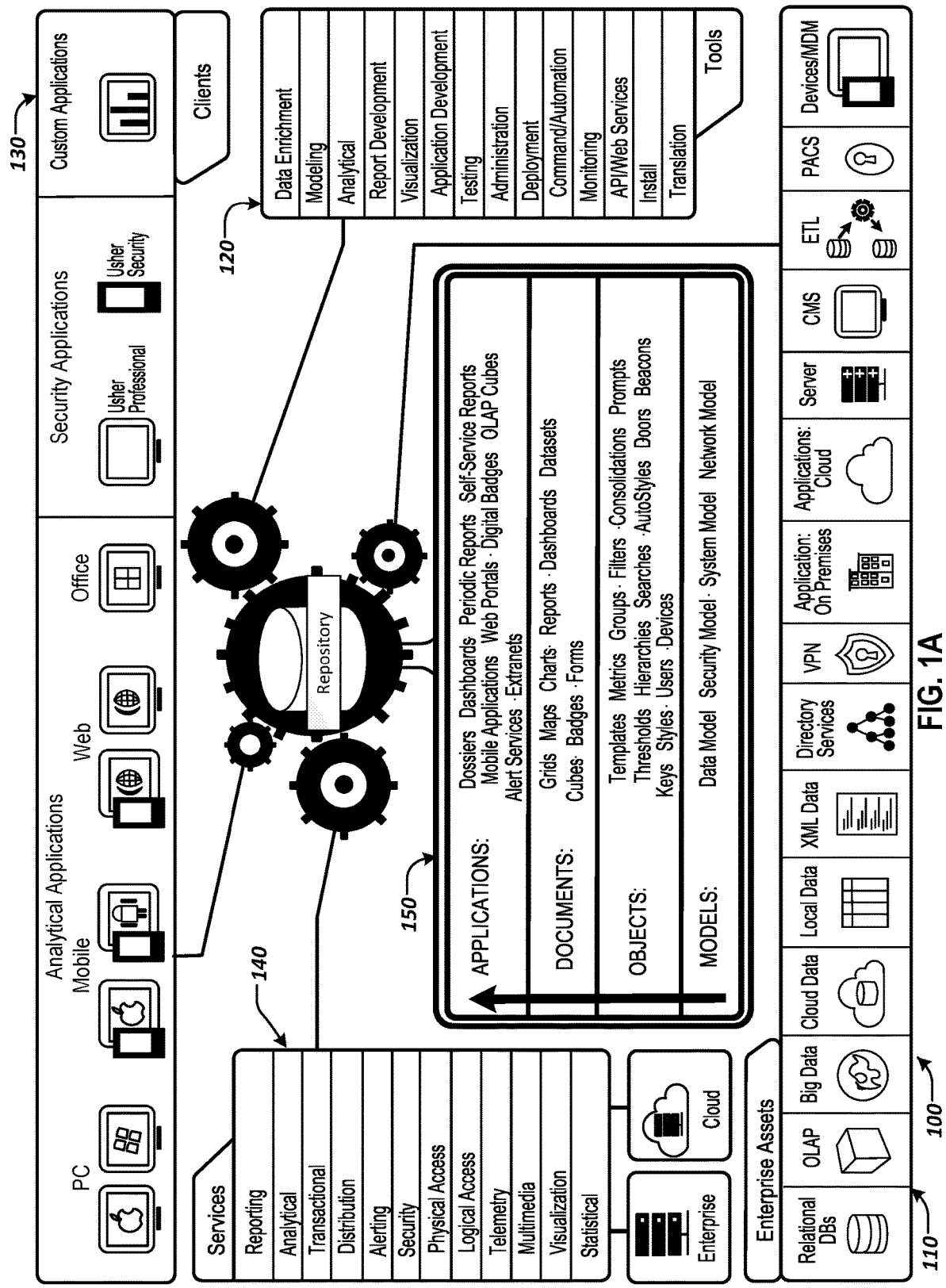
FIGS. 1A-1B are illustrations of an example of a unified, multi-platform enterprise system.

Referring to FIG. 1A, a multi-platform system 100 across an enterprise is illustrated. In general, an enterprise may include various systems, components, platforms, and configurations. As shown in FIG. 1A, the various platforms may include, for example, one or more of enterprise assets 110, tools 120, a client system 130, services 140, and a repository including resources 150.

In some implementations, the client system may include, but is not limited to, one or more of security applications, device analytic applications, and various other custom applications. The device applications may be applications used on devices provided by the enterprise. These devices may include any suitable electronic device such as, for example, a personal computer, a laptop, a mobile telephone, a smart phone, a personal digital assistant, an electronic pad, a smart watch, a smart TV, a mobile audio or video player, a game console, smart glasses, or a combination of one or more of these devices.

In some implementations, the services may include, but are not limited to, one or more of reporting services, analytical services, transactional services, distribution services, alerting services, security services, physical access services, logical access services, telemetry services, multimedia services, visualization services, and statistical services. These services may be provided through enterprise systems or through an Internet-based cloud system.

In some implementations, the tools may include, but are not limited to, one or more of a data enrichment tool, a modeling tool, an analytical tool, a report development tool, a visualization tool, an application development tool, a testing tool, an administration tool, a deployment tool, a command/automation tool, a monitoring tool, an API/web services tool, an install tool, and a translation tool.

In some implementations, the enterprise assets may include, but are not limited to, one or more of relational databases, an online analytical processing (OLAP) service, a cloud database, a local database, an XML database, big data services and databases, directory services, virtual private network (VPN) services, on-premises applications, cloud applications, one or more devices, one or more servers, content management systems (CMS), picture archiving and communication services (PACS), and Extract, Transform, and Label services.

In some implementations, the repository is a storage database that may store various data including one or more of applications, documents, objects, and models. The applications may include, for example, dossier applications, dashboard applications, periodic report applications, self-service report applications, mobile applications, web portals, digital badge applications, OLAP cube applications, alert service applications, and extranet applications. The documents may include, for example, grids, maps, charts, reports, dashboards, datasets, cubes, badges, forms, and credentials. The objects may include, for example, template objects, metric objects, group objects, filter objects, consolidation objects, prompt-related objects, threshold objects, hierarchy objects, search objects, autostyle objects, door-related objects, beacon objects, key objects, style objects, user indicators, and device-indicating objects. The models may include, for example, a data model, a security model, a system model, and a network model.

The client systems, services, tools, enterprise assets, and repository platforms are connected through one or more networks and, combined, provide a unified system for enterprise analytics, mobility, and security. The unified enterprise system may provide access to a large volume of data for a large number of devices. Access to the unified enterprise system may be provided through a graphical user interface (GUI). This GUI may be provided as part of a native application, a web application, a web page, or in another format. However, moving or copying data from one platform or category to another may be problematic. For instance, when an object from one platform is moved to another platform, user designations, access information, and other data associated with the object is not moved. If a user selects the object in the platform to which the object has been moved to, the object may be missing one or more data associated with the object thereby preventing proper utilization or execution of the object.

To address this challenge, an efficient method and system to manipulate data across the various platforms is disclosed. Implementations of such a system are described in further detail with reference to FIGS. 2-15.

Figure 1B:
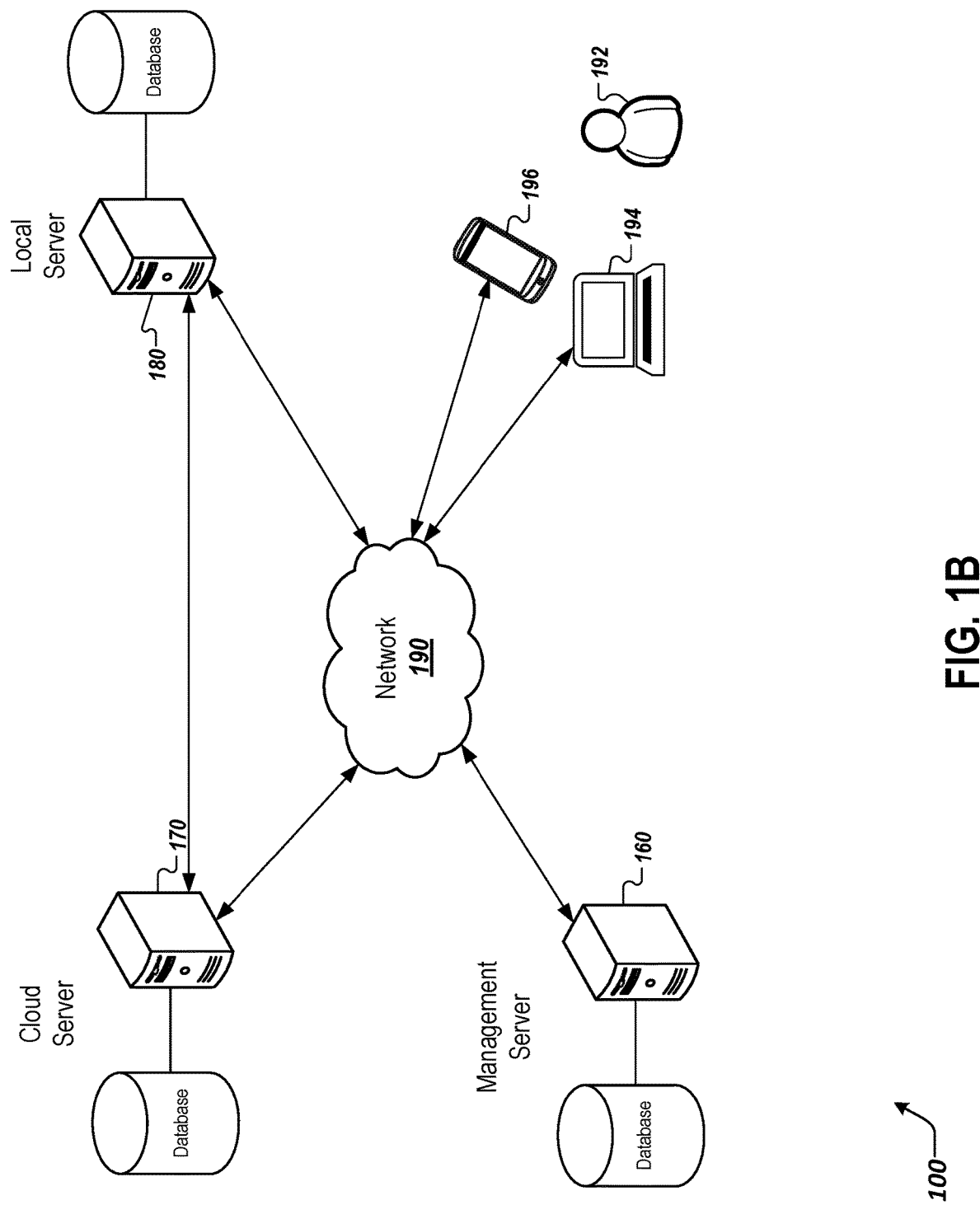

FIG. 1B illustrates the unified multi-platform enterprise system 100 and its connections. The system 100 includes a third-party management server 160, cloud servers 170, local servers 180, and user devices 194 and 196.

The network 190 is configured to enable exchange of electronic communications between devices connected to the network 190. For example, the network 190 may be configured to enable exchange of electronic communications between the management server 160, the cloud servers 170, the local servers 180, and the user devices 194 and 196.

The network 190 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 190 may include multiple networks or subnetworks, each of which may include, for example, a wired or wireless data pathway. The network 190 may also include a circuit-switched network, a packet-switched data network, or any other network able to carry electronic communications (e.g., data or voice communications). For example, the network 190 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 190 may include one or more networks that include wireless data channels and wireless voice channels. The network 190 may be a wireless network, a broadband network, or a combination of networks including a wireless network and a broadband network.

The management server 160 may be operated by an entity that is independent from the operator of the cloud server 170 or the local server 180. In such implementations, the management server 160 operates as a trusted platform that one or more enterprises use to manage environments for multiple users. For example, the management server 160 may allow multiple different enterprises to migrate, manage, upgrade, etc. the environments that a user can access through various applications. The management server 160 can be a server system that includes one or more computing devices.

The cloud server 170 may be one or more virtual servers. In some implementations, the cloud server 170 runs on a cloud computing environment, and includes all of the software it requires to run. The cloud server 170 may not depend on any centrally-installed software, and may host any of various components of the system 100, including the assets 110, the tools 120, the clients 130, the services 140, or the resources 150. In some implementations, the cloud server 170 is the same as the management server 160.

The local server 180 may be one or more physical servers local to the enterprise associated with the system 100. The local server 180 may host any of various components of the system 100, including the assets 110, the tools 120, the clients 130, the services 140, or the resources 150.

The user 192 may belong to an enterprise or organization, and may interact with the system 100 through the user devices 194 and 196. The user devices 194 and 196 can be mobile computing devices, such as smart phones, laptop computers, etc. associated with the user 192. The user devices 194 may run or otherwise access applications that provide access to the resources 150 of the system 100. For example, the user device 196 may be a desktop computer through which the user 192 may access a particular VM 150 in the system 100.

Figure 2:
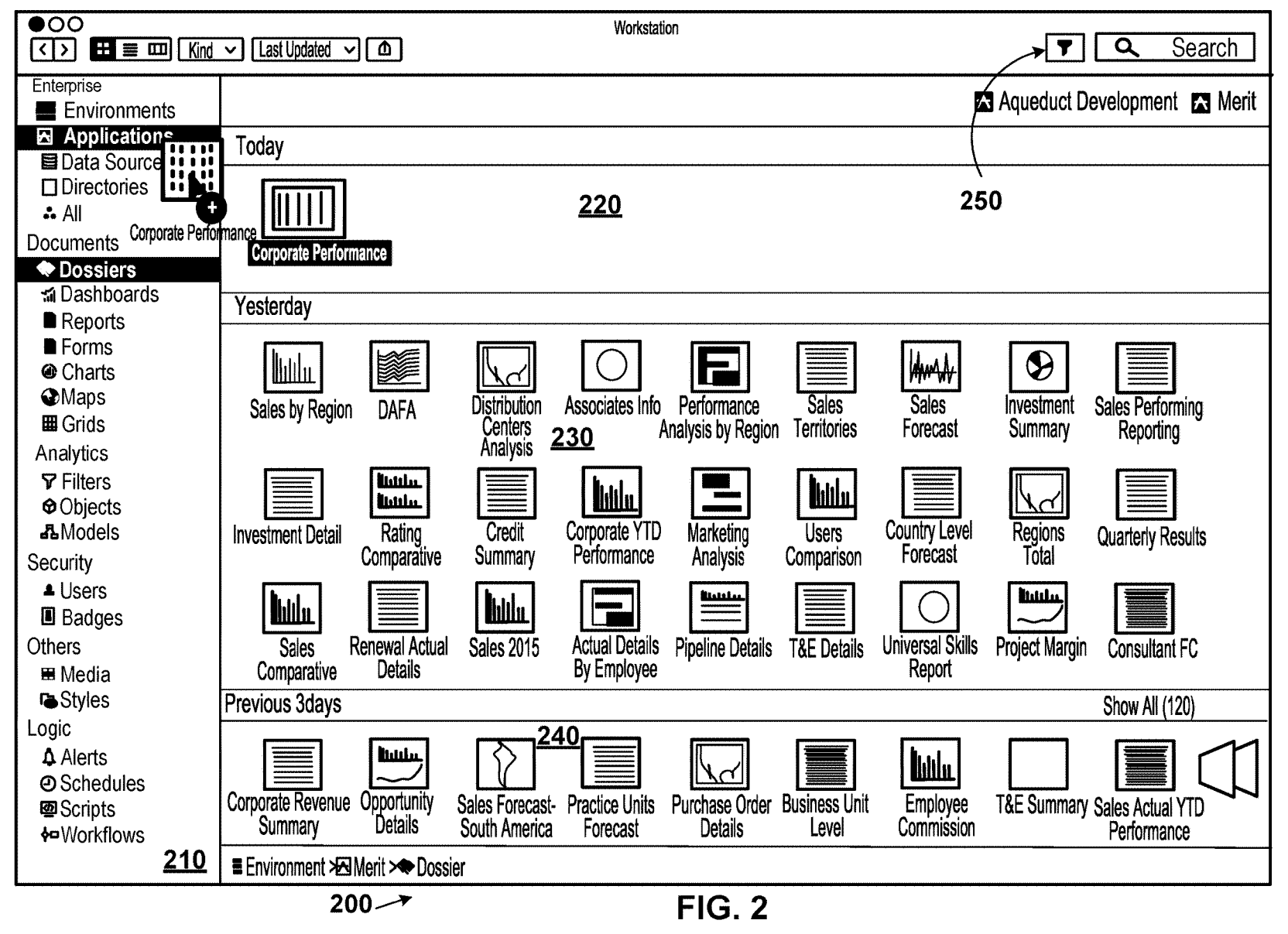

FIG. 2 illustrates a GUI 200 through which a user may access the unified, multi-platform enterprise system. This GUI 200 may be provided by a client device, with information populated from data provided by a server system. For example, a client device can run a management application to view and configure settings of the various servers, client devices, applications, documents, and other elements in the enterprise. The GUI 200 may be divided into one or more portions 210, 220, 230, 240, and 250. In one portion, for example in categories portion 210, a list of categories corresponding to the various platforms in the unified, multi-platform enterprise system is displayed. Within each category, a list of various data objects can also be provided. For example, within the "Documents" category, various types of sub-categories such as Dossiers, dashboards, reports, forms, charts, maps, grids, etc. are listed. Within the "Analytics" category, various types of sub-categories corresponding to filters, objects, and models are listed. Within the "Security" category, users and badges are listed. Within the "Others" category, "Media" and "Styles" sub-categories are listed. Within the "Logic" category, "Alerts," "Schedules," "Scripts", and "Workflows" sub-categories are listed. In general, it should be understood that any suitable type of category in the unified, multi-platform enterprise system available for access to the user may be listed in categories portion 210.

In the illustrated example, a "Dossiers" subcategory is selected by the user. A dossier represents, for example, a user-defined collection of documents, interactive interface elements, and other content. A dossier may include links to live, changing data sources, and may draw on various databases and servers to populate information, refresh charts, tables, and other visualizations, and respond to user interactions within the interface of the dossier. Thus, use of a dossier, like running a server-based application, serving of a document, or performing a database search, can consume system resources within a computing environment. A dossier, like a dashboard, form, report, or other document, may be interactive and may respond to user actions, e.g., to filter, edit, annotate, adjust views, and so on. Displaying documents can involve generating charts, graphs, maps, tables, and other visualizations. These visualizations, and collection of the data for them, can be performed by the server system that serves the document, by a client device that displays the document, or a combination of both.

In response to the selection, portions 220, 230, and 240 are displayed with information indicative of one or more dossiers available in the "Documents" category. For example, portion 220 may display one or more of an alphanumeric text and a graphical representation of a dossier "Corporate Performance" created, accessed, or modified by a user in the enterprise system today. Portion 230 may display one or more of an alphanumeric text and a graphical representation of dossiers created, accessed, or modified by a user in the enterprise system yesterday. Portion 240 may display one or more of an alphanumeric text and a graphical representation of dossiers created, accessed, or modified by a user in the enterprise system at a particular date (e.g., three days ago). In general, portions 220, 230, and 240 may display dossiers in any type of subcategory arrangement (e.g., by subject, by date, by author, by editor, by modifier, etc.).

Figure 3:
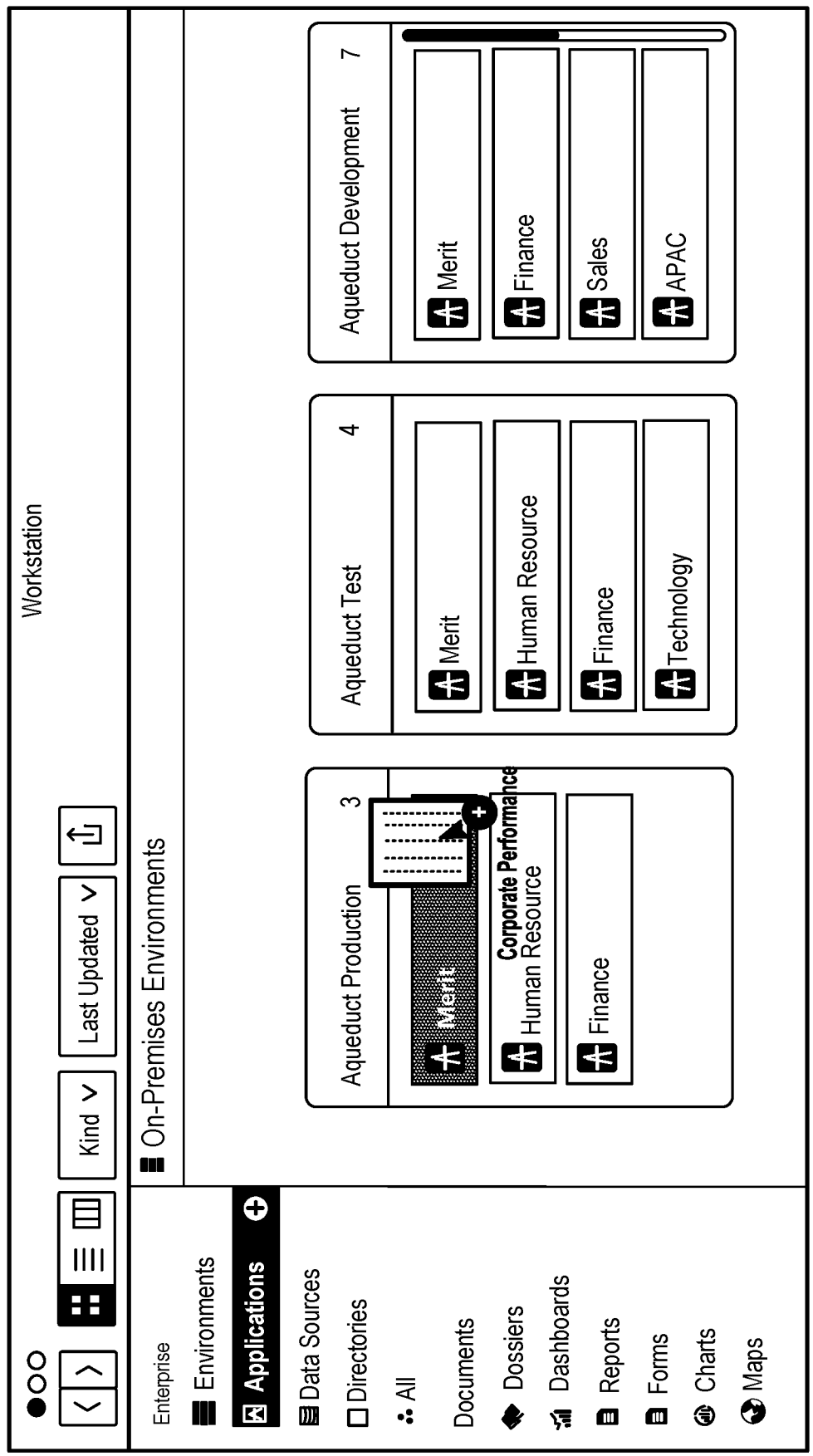
FIG. 3 is an exemplary illustration of a drag-drop operation performed in the GUI.

The GUI 200 and the supporting server system enable a user to configure server systems and their interactions with documents, users, data sources, applications, and other elements of the enterprise. For example, a user may select a document, in this instance one of the "dossier" type, and assign it to be served by a particular application and/or server environment. As shown in FIG. 2, a user may select the "Corporate Performance" dossier icon and drag the icon to the "Applications" sub-category. In response to the drag, e.g., while the user holds the icon over the "Applications" entry in the navigation bar, the GUI may change to provide an interface that displays on-premises environments in the Applications sub-category. As shown in FIG. 3, the user may proceed to drop the "Corporate Performance" dossier representation on a "Merit" application representation.

FIG. 3 illustrates a second GUI 300 provided in response to the user interactions shown in FIG. 2. The GUI 300 shows representations of the "Aqueduct Production," "Aqueduct Test," and "Aqueduct Development" environments, and applications within the respective environments. As an example, the "Aqueduct Production" environment includes a "Merit" application, a "Human Resource" application, and a "Finance" application. As noted above, the user may drag and drop the "Corporate Performance" dossier representation on the "Merit" application representation.

In general, an environment may refer to a collection of one or more computing machines. A drag and drop operation may correspond to a move or copy and paste operation for a particular data object, such as a client 140 or a resource 150. For example, if a user drags and drops an icon representing a document from one platform to a destination platform, in some cases, the document may be moved to the destination platform. In some cases, the document may be copied and stored at the destination platform.

However, moving an object may not simply transfer a single file. The system is configured so that moving objects can also migrate auxiliary data, settings, and user access. For example, moving a dossier from one application to another, or from one environment may initiate a series of tasks that connect and disconnect data sources, migrate users and resources between systems, and so on, as described below. Moving a document can thus change which servers or environments host the document and serve it to a set of users. Similarly, moving objects such as applications and databases, while shown in a simple interface, can initiate various processes to address the dependencies and requirements of those applications.

In response to completing the drag and drop operation by dragging and dropping the graphical representation of the "Corporate Performance" dossier (hereinafter referred to as "object") on the "Merit" application representation, a system performance prediction indicator may be displayed. In some implementations, the system performance prediction indicator may be implemented as a window, notification, alert, or message that provides information indicative of the likely performance of one or more portions of the unified, multi-platform enterprise system. To provide system performance prediction information, the unified, multi-platform enterprise system may generate a simulation of the environment with the moved data to predict the performance of the unified, multi-platform enterprise system. As part of the simulation, the unified, multi-platform enterprise system may determine the type of object (e.g., dossier) being moved and identify each asset of the object.

Determining the type of object may include one or more of determining a category or subcategory of the object, an asset of the object, a file type of the object, a programming language used to program the object, and, in general, determining any identification feature of the object. Assets of the object may include one or more a metadata model associated with the object, data indicative of users associated with the object, data structures associated with the object, and data sources associated with object.

In some implementations, a metadata model associated with the object includes information indicating how metadata for the object can be obtained and assigned to the object and how the metadata can be represented. The metadata model may include classifications of data that can be assigned to the object and a workflow model that provides a method to access and or use the object and the object's metadata.

In some implementations, data indicative of users associated with the object may include data identifying one or more users of the unified, multi-platform enterprises system that have interacted with the object in any manner, and, for each user, data that indicates a relationship or interaction between the user and the object. The relationship or interaction of the user may include, for example, a creation of the object, a modification of the object, a view or access of the object, an edit of the object, a migration of the object, a copying of the object, and, in general, any action taken by the user connected to the object.

In some implementations, data structures associated with the object may include, for example, an indication of a programming language in which the object is programmed in or can be executed in, a programming code or algorithm for implementing the object, and data indicating how to access or execute the object. The data structures may include keys, hash tables, compiler data, format data, encryption/decryption information, compression information, and password and security information.

In some implementations, data sources associated with object include any source, location, or resource from which data is imported or used by the object when the object is executed.

Figure 4:
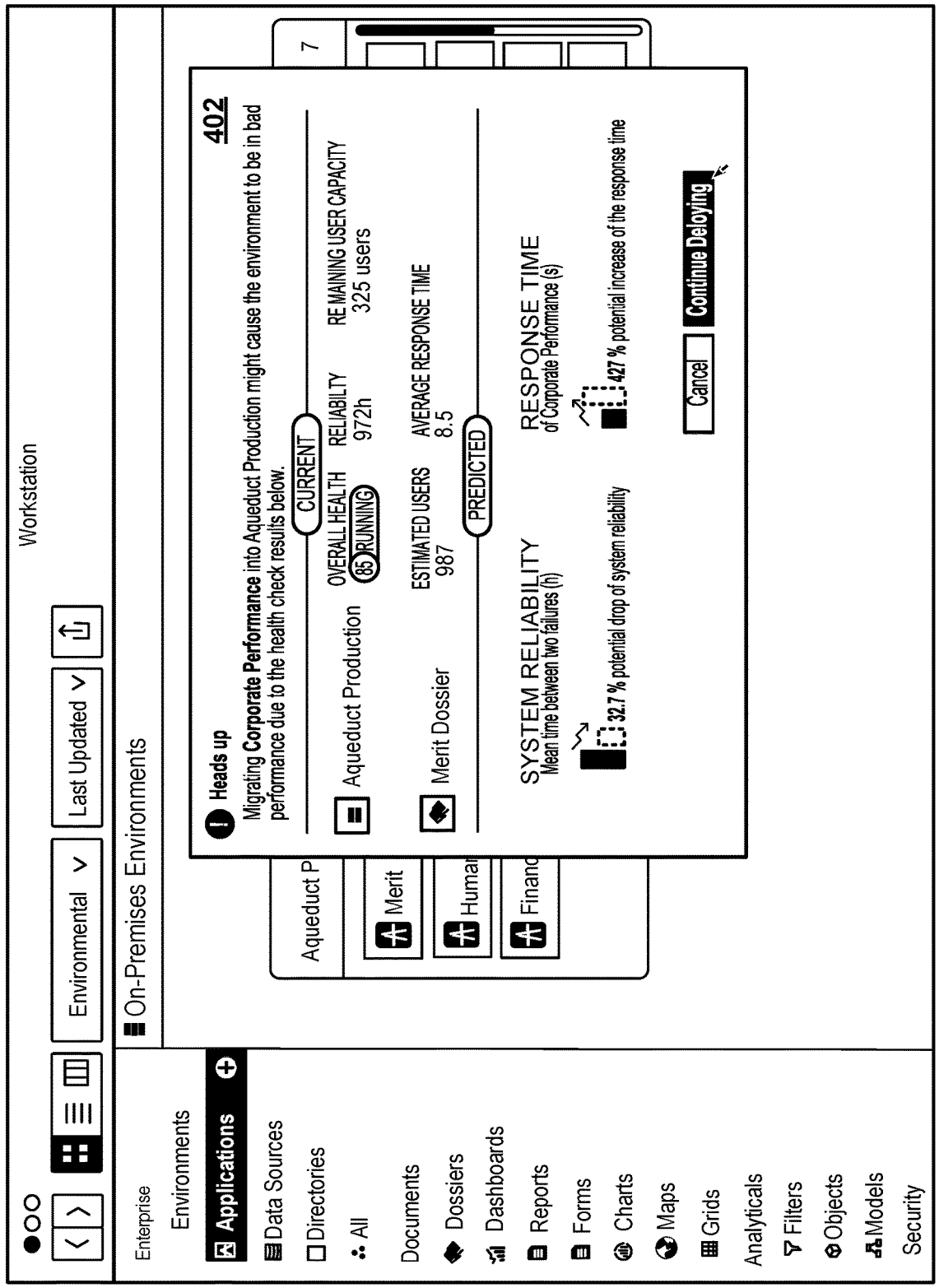
FIG. 4 is an exemplary illustration of a system performance prediction indicator.

Referring to FIG. 4, in response to the user request to change the configuration of the "Corporate Performance" document, the management server 160 generates performance estimates representing the performance that would occur if the requested change was made. In some implementations, the client device provides information indicating the requested change to the management server 160, and may send a request for the management server 160 to provide performance estimates corresponding to the change. In other implementations, the client device that showed the GUI 300 simply requests that the change to the computing system be made, and the management server 160 evaluates the performance impact before carrying out the change. Estimates may be requested to be generated for all changes to enterprise assets, only for changes involving certain data assets or computing devices, only for certain users or documents, or for specific types of actions.

The management server 160 can access logs or other data indicating performance of the document in the current configuration (e.g., response time, throughput, reliability, CPU load, memory usage, etc.), and can determine predicted performance measures for the same performance measures. The predicted performance measures can be generated after the user request, to indicate estimates specific to the configuration change that the user requested, e.g., taking into account the characteristics of the document or other resource to be moved, the data sources relied on by the document, the configurations and other demands on the source server environment and the destination server environment, the usage patterns of the users that use the document, and so on.

The management server 160 also compares the predicted performance for the document with the current performance of the document. The management server 160 determines that the performance would change, and that the change would decrease performance by at least a threshold amount. For example, predetermined thresholds can be set for each of multiple performance metrics to represent when users should be notified. For example, a change that reduces reliability 20% or more, or increases response time more than 50%, or is predicted to increase average CPU load more than 10% can trigger a notification of the potential adverse effects of the user's requested change. The thresholds can measure relative changes with respect to the current configuration. The thresholds may additionally or alternatively measure absolute performance, e.g., whether average CPU load would exceed 80%, if available storage is less than a particular amount, or if the number of users that would be assigned would exceed a particular amount.

If the predicted performance measures do not meet the threshold, and thus indicate that performance after the change would be acceptable, the management server 160 carries out the requested change. The management server 160 may acknowledge the request and provide confirmation when the configuration change has been completed.

If the predicted performance measures meet the thresholds, and thus indicate that performance after the change would be unacceptable, then the management server 160 temporarily blocks the change. In response to determining that the predicted performance following the requested change would trigger one of the thresholds, e.g., would decrease performance by at least a predetermined minimum amount, the management server 160 provides a notification to the client device that indicates the potential effects of the requested change. For example, the management server 160 can provide a message instructing the client device to show a user interface to the user. The message may include information indicating performance measures before the change and predicted performance measures representing the capability of the system after the change.

As shown in FIG. 4, in response to the message from the management server 160, a system performance prediction indicator (SPPI) 402 is displayed on a GUI 400 user's device as a "Heads Up" window and provides information that compares the likely performance of the environment (e.g., "Aqueduct Production") and object (e.g., "Corporate Performance" dossier) after the object is migrated relative to the performance of the environment and object before the object is migrated. For example, as shown in FIG. 4, the SPPI indicates that by migrating the object into the new environment, enterprise system reliability may drop by 32.7% and a response time of the object may increase by 42.7%. The reliability and response time information may be part of an anticipated health score presented to the user that reflects a likely state of one or more portions of the enterprise system if the object is migrated. Although the change in reliability and response time shown in FIG. 4 is provided in a percentage change, in some cases, the change may be presented in non-relative terms. For example, the SPPI may indicate that the response time will likely increase from 3 milliseconds to 3.6 milliseconds and the increase may correspond to, for example, a 42.7% increase. The SPPI 402 can indicate to the user that the requested change has not been made, and requires confirmation before the configuration change will be carried out. By blocking or deferring execution of the requested change, the system can limit the potential for changes with unintended consequences to adversely affect the enterprise computing system. Similarly, erroneous or inadvertent changes can be identified and stopped more easily.

The health score calculations may be executed before the scores are requested. For example, the health scores may be calculated periodically, and may be available very quickly upon request. In some implementations, the health scores may be calculated in response to certain actions taken with respect to the system 100. For example, the health scores can be calculated in response to an environment migration, a change in configuration to the environment, and various other actions taken within the system 100.

The health score calculations can be based on specific performance metrics of the system 100. For example, the health score calculations can be based on an amount of time for a report to be generated (e.g., a standard report used for benchmarking, or a particular report specific to and used in the organization), a response time of a particular server to a ping, a load time of a server when an application is requested, and various other performance metrics. The task of generating a report or generating other types of documents can provides information about particular characteristics and performance metrics of a system. In some implementations, generating a report involves extracting values from data sources and populating various fields of the report. For example, a report may be a template with fields for specific characteristics of the system including available memory, percentage of CPU used, and various other characteristics.

In some implementations, the health scores may be calculated by migrating the selected object and generating a report using the object in the new environment, which may be an existing environment in the enterprise or a newly generated environment created by the system. For example, a health score for a migration of a user named Brad may be calculated by migrating a copy of Brad's processes into the new environment and then generating a report on particular characteristics of Brad's processes. The health score for Brad's migration to the new environment may include an indication of Brad's effect on the new environment. In such examples, the migration may be temporary, and the user may be able to reverse the migration after being presented with the effects of the migration. In some implementations, a simulation of aspects of the migration may be performed without actually initiating or temporarily performing migration. For example, a profile of usage patterns of a user or group of users may be determined from logs or other usage records. The profile may indicate, for example, a frequency of database accesses, typical storage requirements, types of queries run, etc. From this profile, actions similar to those in the profile can be performed in the new environment to measure performance, even without performing the same actions or using the same documents the users actually used.

In some implementations, the health scores for a migration from a current environment to a new environment (e.g., one different from the previous environment) may be calculated by using known characteristics of the new environment. In such examples, the health scores provide accurate predictions for the performance of the object being migrated in the new environment. Benchmark results or scores for particular characteristics of the initial system are taken prior to the migration, and these benchmark values can be used to estimate performance of the system in the new environment. For example, if the system has access to 32 computing cores in the current environment and has access to only 16 cores in the new environment, a projection that the system has reduced access to processing power can be generated. A health score for the migration of the system may indicate that there is a reduced performance, and, for example, reports may take longer to generate, applications may take longer to initialize, etc. In some implementations, health scores and other measures are generated by the management server 160 and provided to a user's client device for display. In some implementations, health scores and other measures are generated by a client device, for example, by computing the scores from data from the management server 160 and/or one or more databases. The scores can be generated in response to a notification from a management server or in response to a policy for the enterprise. As an example, a policy may indicate that certain actions, such as changing the assignment for an item to be served from one environment (e.g., a first server system) to a second environment (e.g., a second server system), should always be evaluated for performance impact.

In general, the anticipated health score may include various suitable system performance indicators. For example, the anticipated health score may include, but is not limited to, data indicative of one or more of a response time, reliability, data processing speed, data processing capacity, available storage, user capacity, security status and indicators, and network connectivity and performance.

The system may generate the expected load characteristics in response to the user action to drag from one portion of an environment to another. To generate health scores or performance predictions, the system may access data indicting prior usage of the object and current configuration data. Various documents, applications, and other objects may be profiled to indicate typical usage patterns and resource requirements. For example, bandwidth, storage, and computation requirements can be determined from the characteristics of the application, determined from previous access, or estimated from objects with similar characteristics. In this manner, the resource needs of an object can be known at the time a user attempts a change. The available capacity of the destination environment, and the recent history for the environment, can be used also to generate the scores.

The SPPI may also provide supplementary information regarding the object. For example, as shown in FIG. 4, the SPPI may provide information regarding a reliability of the object or a remaining user capacity for the object prior to migration of the object. In some implementations, the SPPI may also provide one or more of reports, analyses, or recommendations regarding the migration of the object. The SPPI may provide guidance to a user regarding the effects of the migration of the object on the performance of the system or environment.

For example, as shown in FIG. 4, the SPPI indicates that migration of the object "might cause the environment to be in bad performance." In some implementations, the SPPI may provide a recommendation and/or instructions for migrating the object to another environment or category as a more suitable option for data migration or for improved system performance. In some implementations, the SPPI may provide a recommendation not to migrate the object.

In some implementations, the SPPI may provide feedback to the user in terms of which functionality would be affected. The feedback may be provided through a user interface such as an application dashboard, a separate window, etc. In some implementations, the SPPI may provide a visual representation of the effect of a user's actions (e.g., an object migration) on the environment or system. For example, the SPPI may provide a visual data representation of the change the migration of a particular machine to a new environment would have on the environment through a bar graph on a dashboard interface displayed to a user. In other examples, the SPPI may provide a textual indication of the effect of an object migration on a particular environment or system's performance, such as "Are you sure you wish to complete this migration? The change in report generation time is +0.6 seconds, indicating a 45% decrease in performance."

In some implementations, the SPPI may classify the predictions into different alert levels and provide an indication of the alert level to the user. For example, the SPPI may use a four-level alert system such that: in the first level, the enterprise system is not predicted to be impacted negatively by the object migration and no warning message is generated for the user; in the second level, the enterprise system is predicted to be impacted negatively by the object migration by less than a threshold amount, and a proceed with caution alert message is generated and presented to the user; in the third level, the enterprise system is predicted to be impacted negatively by the object migration by more than a threshold amount and an alert indicating that the object cannot be migrated without a system administrator's approval is generated for the user; and, in the fourth level, the enterprise system is predicted to be harmed significantly (e.g., much greater than the threshold amount) by the object migration and an alert indicating that the object migration cannot be completed is generated for the user. Although a four level alert system is described, multiple levels of alert may be used to communicate the likely effectiveness, security, or efficiency consequences resulting from the object migration.

By providing a user with alerts and project performance changes, the SPPI allows users to make informed decisions about whether they wish to complete certain actions. The alerts, prompts, and supplemental information provided by the SPPI are unobtrusive, and are presented only when a user attempts to make a change to an environment or system. By analyzing the system in response to a user action, the described method of providing alerts reduces the amount of computing resources used.

In some implementations, the SPPI may actively monitor an environment or system to provide suggestions that improve performance. The SPPI may provide actionable insights, or recommendations, automatically without user input or action. For example, the SPPI may display a prompt to a user asking if the user would like to migrate a particular application to a different environment in order to increase performance of the application.

To determine when to provide a recommendation or warning, the management server 160 can estimate performance impact of user changes in response to user actions. For example, for each configuration change a user initiates, or for changes that meet certain predetermined criteria, the management server 160 can determine one or more estimated performance measures. While the performance measures are generated in response to user configuration change requests, and are customized for the particular change requested (e.g., the specific servers, documents, users involved), the management server 160 can use previously generated benchmark results and conversion measures to maintain appropriate responsiveness.

For example, the management server 160 may store benchmark results, performance measures for different computing environments, and conversion factors prior to the time a user requests a configuration change, so that predictions of the performance impact of a configuration change can be generated quickly once a change is requested. For example, in some implementations, the predicted performance measures may be generated and provided e.g., 10 seconds, 5 seconds, 2 seconds, 1 second, or less after a change is requested. In some implementations, these performance predictions may be provided substantially in real time, as the user is managing the configuration of the system.

The management server 160 may automatically benchmark the capabilities of different devices in the enterprise computing system. This can involve actively instructing different devices to perform a standardized set of tasks while measuring the performance. The management system 160 can also monitor storage capacity remaining, average and peak CPU loads, and other performance measures for different systems in their current configurations. In addition, the management system 160 can passively monitor and store data indicating the resource demands required to perform particular tasks, such as to load or generate individual documents or run individual applications, as users use the enterprise computing resources in everyday use. In addition to these profiles of system capabilities and typical resource demands, the management system 160 can compare the performance of the same or similar task on one system relative to another. From these comparisons, and from comparisons from benchmark test results, the management server 160 can determine conversion factors to generate predictions.

For example, the performance of a task of a particular application may be determined to vary between servers having different numbers of CPUs, for example with a response time of 8 seconds for a server with 4 CPUs, 6 seconds for a server with 8 CPUs, 4.5 seconds with a server with 12 CPUs and so on. For this application, a curve that extrapolates expected performance for different CPU counts can be determined. Then, when a requested change would change the CPU count from 10 CPUs to 5 CPUs, the impact on responsiveness can be calculated based on the change between locations on the curve corresponding to the change from 10 CPUs to 5 CPUs. Other factors, such as available working memory, communication bandwidth, existing load, and so on can also be taken into account with other comparisons.

In some implementations, the SPPI may provide the user with alerts asking "Are you sure you wish to complete this action? This decreases the security of your system and increases latency." In some implementations, the SPPI provides the user with an option to proceed with or terminate the object migration. For example, after presenting the predicted health score of the enterprise system if an object is migrated, the SPPI may request the user to confirm whether the user would still like to continue with the object migration or if the user would like to terminate the object migration. In some cases, if the predicted health score is less than a particular threshold (e.g., representing a particularly adverse result of a change), the user may not be presented with the option to continue with the object migration, and the user will instead be informed that the object migration will either be terminated or requires approval by a system administrator.

After presenting the SPPI, if the enterprise system receives a selection indicating that the user has elected to continue with the object migration, the enterprise system may execute the object migration and provide system health reports to the user.

In some implementations, to execute the object migration, each asset of the object is provided in the destination (e.g., "Aqueduct Production") environment. In some implementations, to provide the assets in the destination (e.g., "Aqueduct Production") environment, the original object assets may be copied, redistributed, or modified so that the object may function and be executed in the new "Aqueduct Production" environment.

In some implementations, the system may automatically make changes to environments based on health scores for the environments. The system may periodically generate health scores for a particular environment and monitor the health scores to determine that a change to the environment should be made, and may use the health scores or other performance measures to determine what change to make. For example, the system may determine that the health score for server reliability for a certain environment has decreased, and that the lowest factor in the server reliability score is the amount of memory available. In this example, the system may automatically determine that more memory will be made available to the objects within the environment, and determine the amount of memory to add to the environment.

FIG. 5 is an exemplary illustration of the enterprise system providing health reports and alerts on a GUI 500 shown at a client device after object migration has occurred. For example, as shown in FIG. 5, four health alerts have been generated for the "Aqueduct Production" environment. The health alerts indicate that system reliability and capacity has reduced, and that the performance of the "Dossiers" and "Dashboards" subcategories has reached a threshold. In general, health alerts may be provided for any environment in the enterprise system, and the health alerts may be generated on a continuous or periodic basis. In some implementations, health alerts are generated after detection of an event, such as a decrease in capacity, performance, or reliability beyond a set threshold.

In some implementations, users may be able to review alerts at any time. For example, a user may select the health alerts from an interface element to view the active health alerts. In some examples, users may be able to perform actions related to the alerts, such as dismiss the alerts, delay the alerts, etc.

Figure 6:
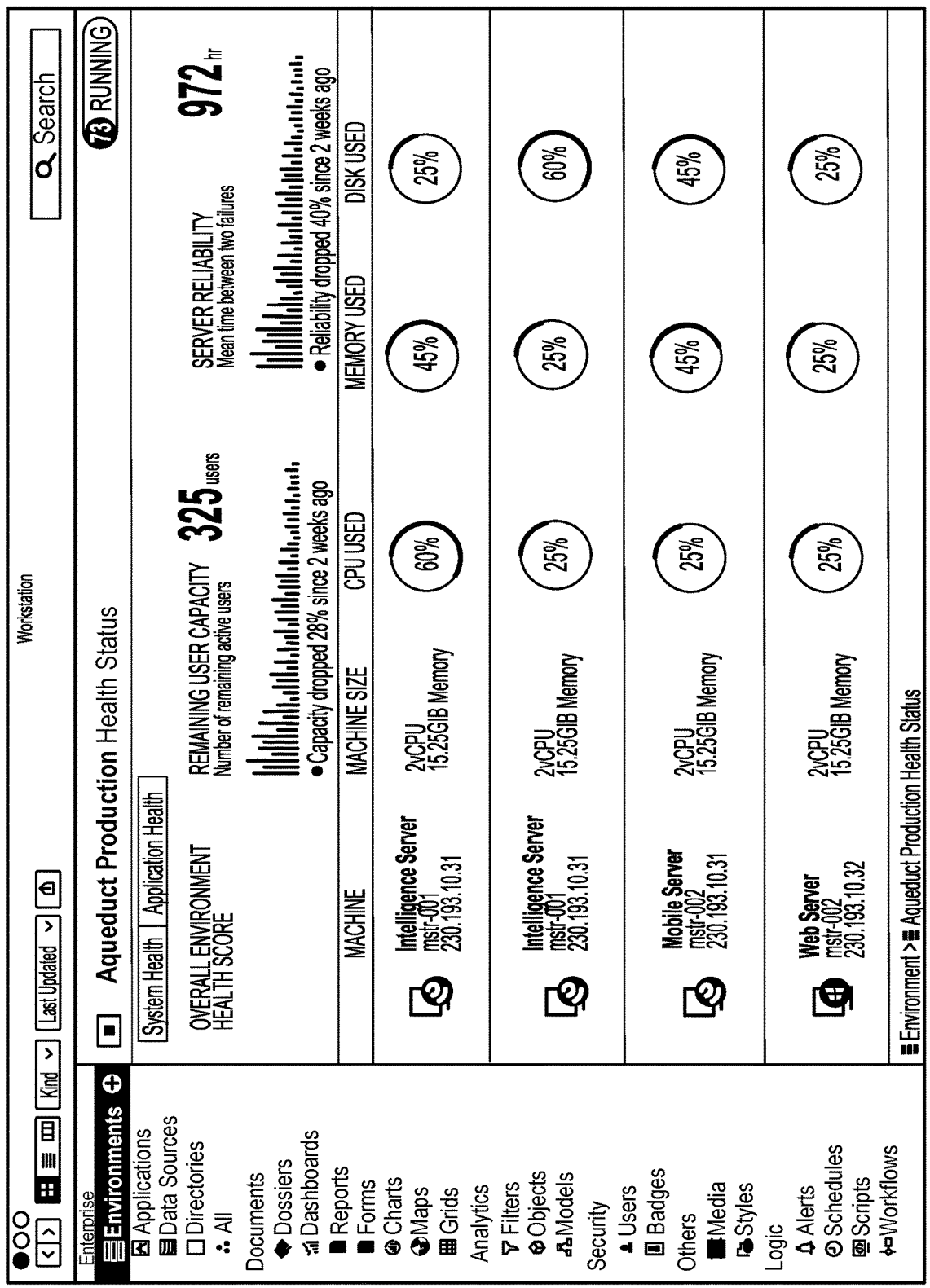
FIG. 6 is an exemplary illustration of an overall system health score.

FIG. 6 is an exemplary illustration of an interface 600 displaying an overall environment health score for a particular environment. An environment is a grouping of servers to engage in a certain task. A health score represents an estimated or projected measure of performance of an environment. In FIG. 6, the overall health score for the "Aqueduct Production" environment is shown. The overall health score for an environment may be calculated based on multiple dimensions, and these dimensions may be displayed in a user interface. In some examples, users may select dimensions to be included in the health score calculations through the user interface.

The health score may be calculated based on various characteristics of the system, such as the mean time to generate a report, the mean time between failures of the system, etc. The reports may be templates with fields that are populated with values determined by the system. As described above with respect to FIG. 4, the reports may be highly customizable. An end user may create reports used in health score calculations, and may change the factors included in a report. In some implementations, a user may customize a report to include only the factors they are interested in.

In some implementations, users may select which reports or which portions of the reports are part of the health score calculations. A user may select reports on characteristics and performance metrics of particular machines to be included in a health score calculation. For example, a user may select their particular machine and their two most frequently used applications to be used in a calculation for their environment health score. In some implementations, the reports that are included in a health score calculation for a particular environment are predetermined. For example, an overall environment health score for an environment including machines, users, and applications may include a report on a randomly selected machine, a report on a randomly selected user, and a report on a randomly selected application.

Different environments and applications may have different algorithms for calculating a health score and a different set of reports included in the health score calculation. In some implementations, different environments and applications can have different health scores, such as overall machine health scores, individual user health scores, etc.

In some implementations, each resource or object in an environment includes a universal product code (UPC) that uniquely identifies the resource or object. The system may use the UPCs to determine when a particular functionality or object is accessed by a report, altered by a user, etc. For example, the system may access a database of UPCs to determine which portion of the system was affected by a user-initiated cache clearing. The system may determine which objects were accessed while a report was generated by determining which UPCs are included in the report and which portions of the environment are included in the health score calculations. In some implementations, the system can determine when users have interacted with products associated with a particular UPC. In some implementations, the system may use the UPCs to locate a resource or object. For example, a user may determine which portions of an environment are included in a health score calculation by indicating which UPCs are included.

In some implementations, users may set parameters for the health score calculations. For example, a user may define that a health score is generated by averaging the scores of different components of the health score. The user may define a range of time within which a report must be generated in order for that aspect of the health score to receive full marks. In such an example, the user may define that if a report is generated within 3 seconds, that portion of the health score is 100, if a report is generated after 3 seconds but within 5 seconds, that portion of the health score is 50, and otherwise, that portion of the health score is 0. In another example, a user may determine that the score for a portion of the health score can be determined based on the performance of the reports included in the calculation. For example, if 73% of the reports are generated within the set range of time, the overall health score is 73.

In some implementations, an individual score that is used in the calculation of an overall health score can be weighted based on the distance a metric is from a predetermined score or a user selected guideline. For example, a user may determine a band of acceptable values for a particular metric, such as the load time for a particular application, the amount of memory used, etc. In such an example, if the value of the particular metric for a particular environment is determined to be outside of the band of acceptable values, the particular metric is weighted more heavily than if it was within the band of acceptable values. In some implementations, the farther outside of a band of acceptable values a metric is, the more heavily it is weighted. For example, if a metric is two standard deviations outside of the band of acceptable values, it will be weighted more heavily than if it is one standard deviation outside of the band of acceptable values.

In some implementations, factors are weighted based on their impact on the environment's performance. For example, if an application within a particular environment runs out of disk space, the performance metric for the application could be weighted heavily because the application is using an excessive amount of processing power to compensate for the lack of disk space.

In some implementations, there may be a default set of rules or a default algorithm for determining a health score. For example, there may be a default set of reports that are generated, and the scores assigned to each health report may be averaged to determine a health score. In some implementations, users may customize the set of rules or the parameters of the health score calculation. For example, a user may customize the set of reports that are included in the health score calculation, alter the algorithm used to determine the health score, select certain portions of the environment to include in the reports, etc. Different environments and applications can have different algorithms, different sets of reports, etc. for calculating a heath score.

In some implementations, data used for generating the reports are captured periodically. For example, data in a particular environment may be captured every hour. In some implementations, data used for generating the reports are captured in response to certain actions. For example, data in a particular environment may be captured in response to a user initiating a migration of an object to a new environment.

FIG. 6 is an exemplary illustration of an overall system health score. In this particular example, the SPPI is displayed in the interface 600, and may display information regarding the performance parameters of an environment. Information regarding various performance parameters such as the remaining user capacity and server reliability in the "Aqueduct Production" environment, machine storage size, memory usage efficiency, disk usage efficiency, and a central processing unit efficiency associated with particular servers is displayed. One or more graphical and alphanumeric representations may be used to display the various performance parameters. For instance, a bar graph is used to illustrate how the remaining user capacity and server reliability has changed over a two-week period.

In some implementations, the interface 600 may display the changes in a health score across different states of a particular environment. For example, the interface 600 may display a line graph that displays the historical trends of a health score for a particular application. In such examples, the interface 600 may display information for a particular object or resource over a period of a day, a week, a year, etc. In some implementations, the interface 600 may display visual representations of the changes in the overall health score for an environment, a particular machine, etc.

A user may be able to select an overall health score for a particular environment or for particular applications within the environment. For instance, in FIG. 6, a "System Health" tab is selected and therefore an overall health score for the "Aqueduct Production" environment is displayed. Upon selection of the "Application Health" tab, a user may select one of more applications in the environment and view the health score for each application.

In some implementations, the interface 600 displays an overall snapshot of the current performance of different servers or applications in a particular environment. For example, the interface 600 can display performance metrics, such as health scores, for each server in a particular environment. In some implementations, the interface 600 displays performance information for a set of machines or servers in an environment. For example, the interface 600 may display performance information for the machines performing below a performance threshold. In some examples, the system automatically determines performance information to display on the interface 600. For example, the interface 600 may display performance information for a particular user's machine when the particular user is accessing the interface 600.

In some implementations, users may be able to sort the information displayed in the interface 600 by characteristics such as display format (e.g., mobile, web), browser, adoption rates, performance, etc. For example, a user may sort the information display in the interface 600 based on whether a particular application is performing at a particular threshold performance level. In some implementations, the system may determine that a particular application is performing abnormally. For example, the system may determine that the application is using an unusually large portion of the processing resources of a particular machine, and may display the performance metrics of the particular application in the interface 600.

In some implementations, users can interact with the interface 600 through various interface elements. For example, a user can click on the side bar of the interface 600 to select a different category to view, a different environment, a different application, etc.

Figure 7:
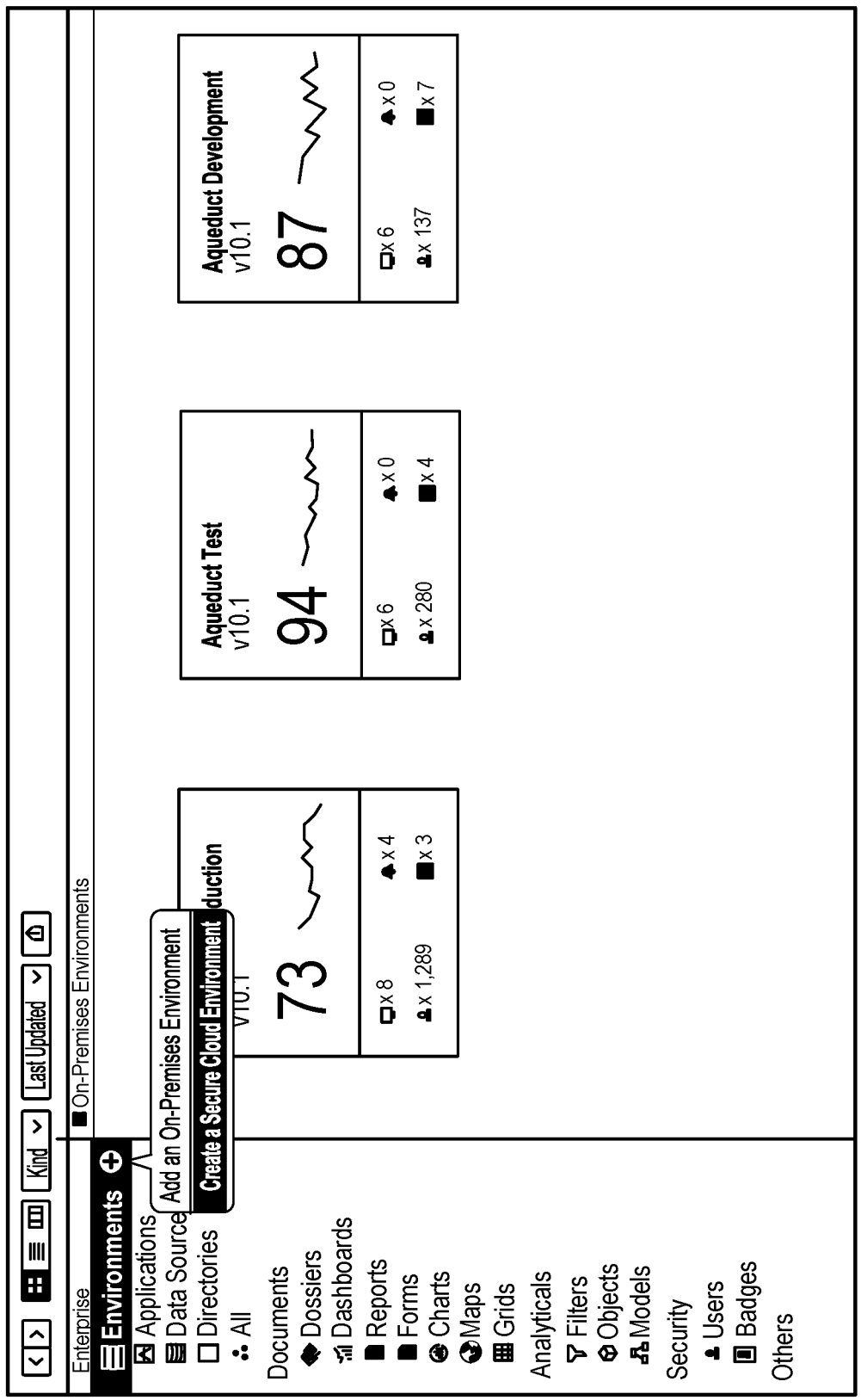
FIG. 7 is an exemplary illustration of a multi-application status indicator.
Figure 8:
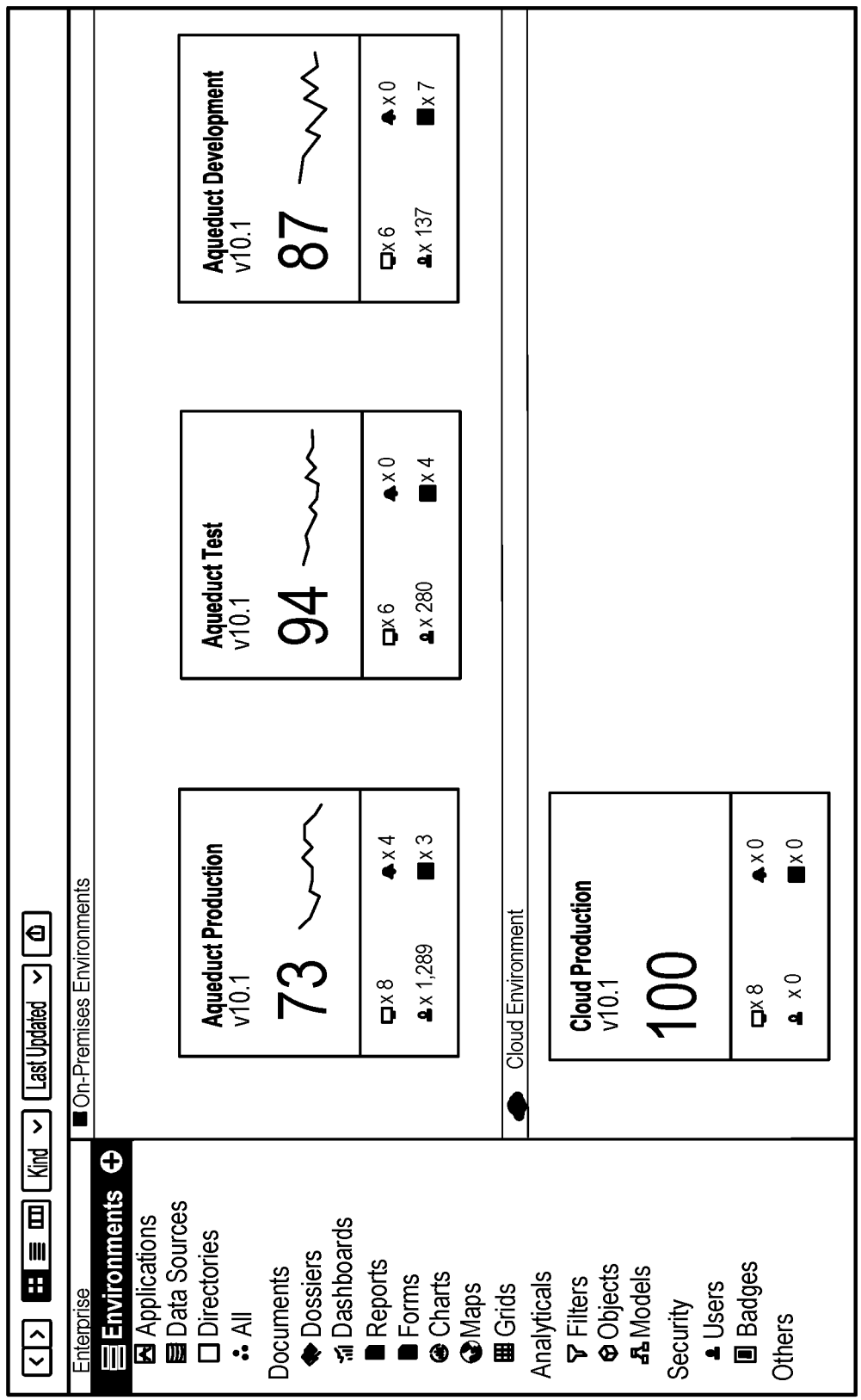
FIG. 8 is an exemplary illustration of a GUI displaying a status of a cloud-based environment.

FIG. 7 illustrates another interface 700 providing information about the environments available in the unified, multi-platform enterprise system. However, compared to FIG. 3, in FIG. 7, status information is provided for each environment. Status information may include various data indicative of the environment's health such as, for example, an overall health score indicator, the number of machines, alerts, users, warnings, and failures in each particular environment.

In some implementations, a user may choose to create a new environment such as a secure cloud environment. As shown in FIG. 7, a user may select the option to create a new secure cloud environment from a menu in the GUI 700, and a new environment, entitled "Cloud Production," may be created, as shown in the GUI 800 of FIG. 8. If the "Applications" category is selected in the GUI, an alternative view of the environments available in the unified, multi-platform enterprise system and applications located within the respective environments is displayed, as shown in the GUI 900 of FIG. 9.

Figure 10:
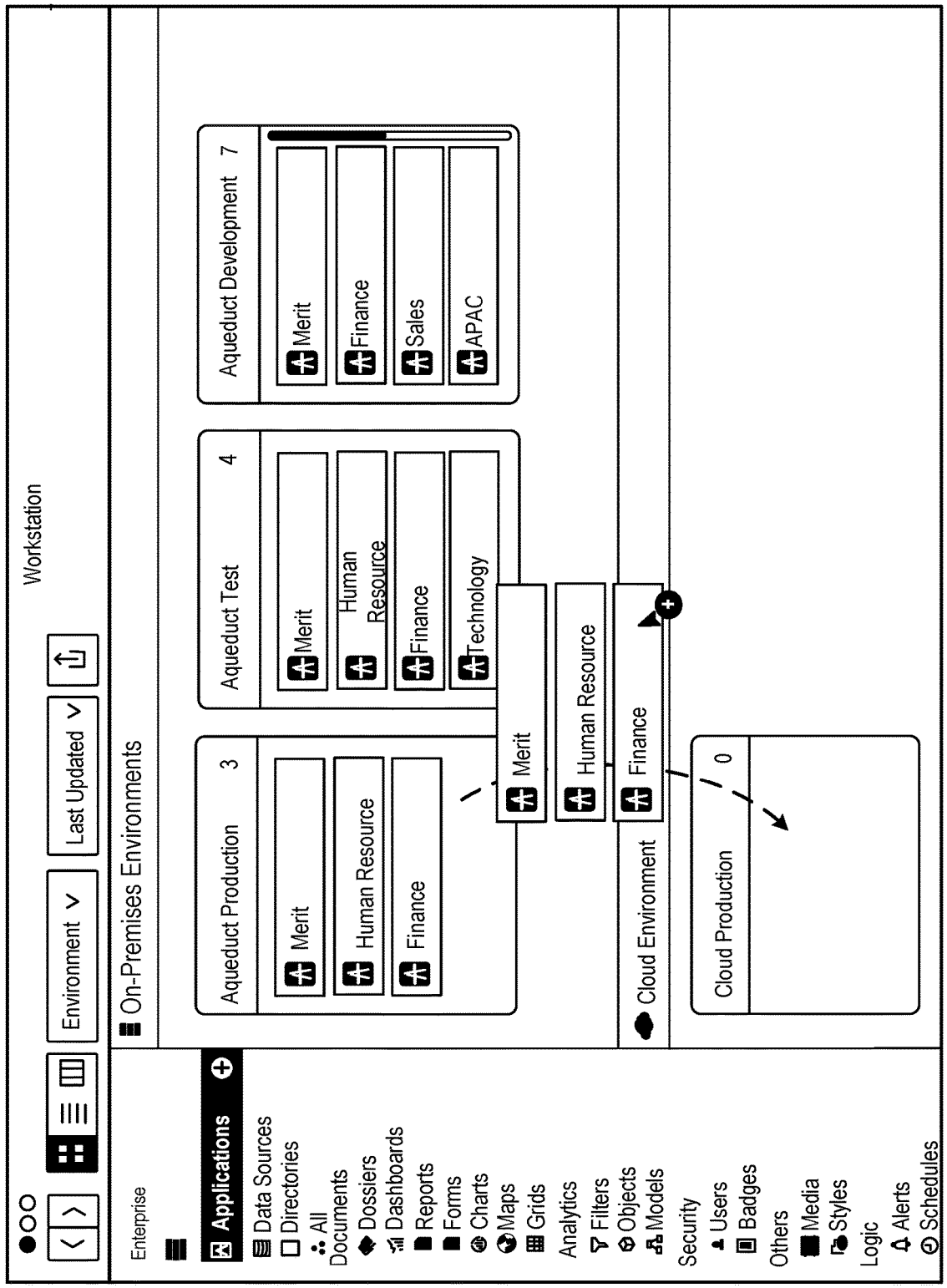
FIG. 10 is an exemplary illustration of a drag-drop operation to drop objects in a cloud-based environment.

FIG. 10 illustrates a GUI 1000 and another drag-and-drop operation in which a user is copying the applications "Merit," "Human Resource," and "Finance" into the "Cloud Production" environment from the "Aqueduct Production" environment. As described above, when manipulating data (e.g., copying data or migrating applications) from one platform, category, or environment to another, numerous operations and tasks are being executed in the background. These numerous operations and tasks include, for example, determining the type of data object (e.g., the applications in FIG. 10) being manipulated and determining features and assets of the object. The determined features and assets of the object may be reconfigured, copied, or modified to copy the "Merit," "Human Resource," and "Finance" applications into the "Cloud Production" environment. Assets of the object may include one or more a metadata model associated with the object, data indicative of users associated with the object, data structures associated with the object, and data sources associated with object.

In some implementations, the resources or data assets of the object may be displayed in user interfaces such as the interfaces shown in and described with reference to FIGS. 3-6.

The process of migrating or upgrading an environment within an enterprise may include the management server 160 establishing a baseline level of performance by running quality assurance reports and tests and documenting a baseline system performance. Establishing a baseline may include determining the performance characteristics of the particular system.

Next, the management server 160 determines the states of machines within an environment by collecting and taking backups of configuration files within the infrastructure (e.g., backing up plug-ins, metadata, .ini, etc.).

The management server 160 then deploys the new environment. An infrastructure is created by allocating hardware required by the new environment and/or deploying a virtual machine (VM) with the new environment. The management server 160 identifies pre-requisite components from the baseline measures and installs those components, and organization specific settings (e.g., antivirus software, administrative access rights, etc.) are applied.

The management server 160 sets up the database platform is set up by installing and configuring a database server. A third-party platform for managing the migration and upgrading of an enterprise's systems is installed. Next, management server 160 applies the previous machine state to the new infrastructure by merging the configuration files form the original infrastructure into the new infrastructure. Then, the databases are restored from backup files or copied from the environment that runs in parallel.

The management server 160 sets up and configures individual applications and management software in the new infrastructure. For example, search software, network management software, etc. may be configured for operation in the new environment.

The management server 160 performs quality assurance tests, and a new baseline with performance characteristics and metrics is established. Finally, the management server 160 compares the initial baseline and the new baseline evaluates the effects of the migration and/or upgrade.

In some implementations, the deployment of an environment further includes updating a user interface or a console through which a user provides input to the system. For example, the management server 160 may provide a user device with a notification that the build and deployment of a new environment is complete. Upon completion of deployment, the management server 160 may continue to configure non-critical applications, such as platform services, web and mobile settings, email, etc. In some implementations, the management server 160 may notify users of the new environment that the migration or update is complete. For example, the management server 160 may send users an email stating that the new environment is ready for use.

The process of migrating and/or updating an environment and deploying the environment may be executed automatically by the management server 160 when a user initializes migration. For example, the management server 160 may perform the process automatically when it is given data indicating that a user instructed the migration to occur, e.g., through a drag and drop operation on a user interface of a client device.

In some implementations, the management server 160 runs software that provides the data shown in user interfaces as illustrated and described in the present application. That data can be rendered or interpreted by a client device that displays the user interfaces depicted in the figures. For example, the client device can run a management application that communicates with the management server 160 to obtain messages or performance measures to display, and the application on the client device generates the visualizations and interactive elements based on the data received. The management server 160 manages the transition, migration, updating, etc. of the environments within the system 100.

In some implementations, the local server 170 runs software that provides the user interfaces as illustrated and described in the present application. The local server 170 manages the transition, migration, updating, etc. of the environments within the system 100.

Figure 11:
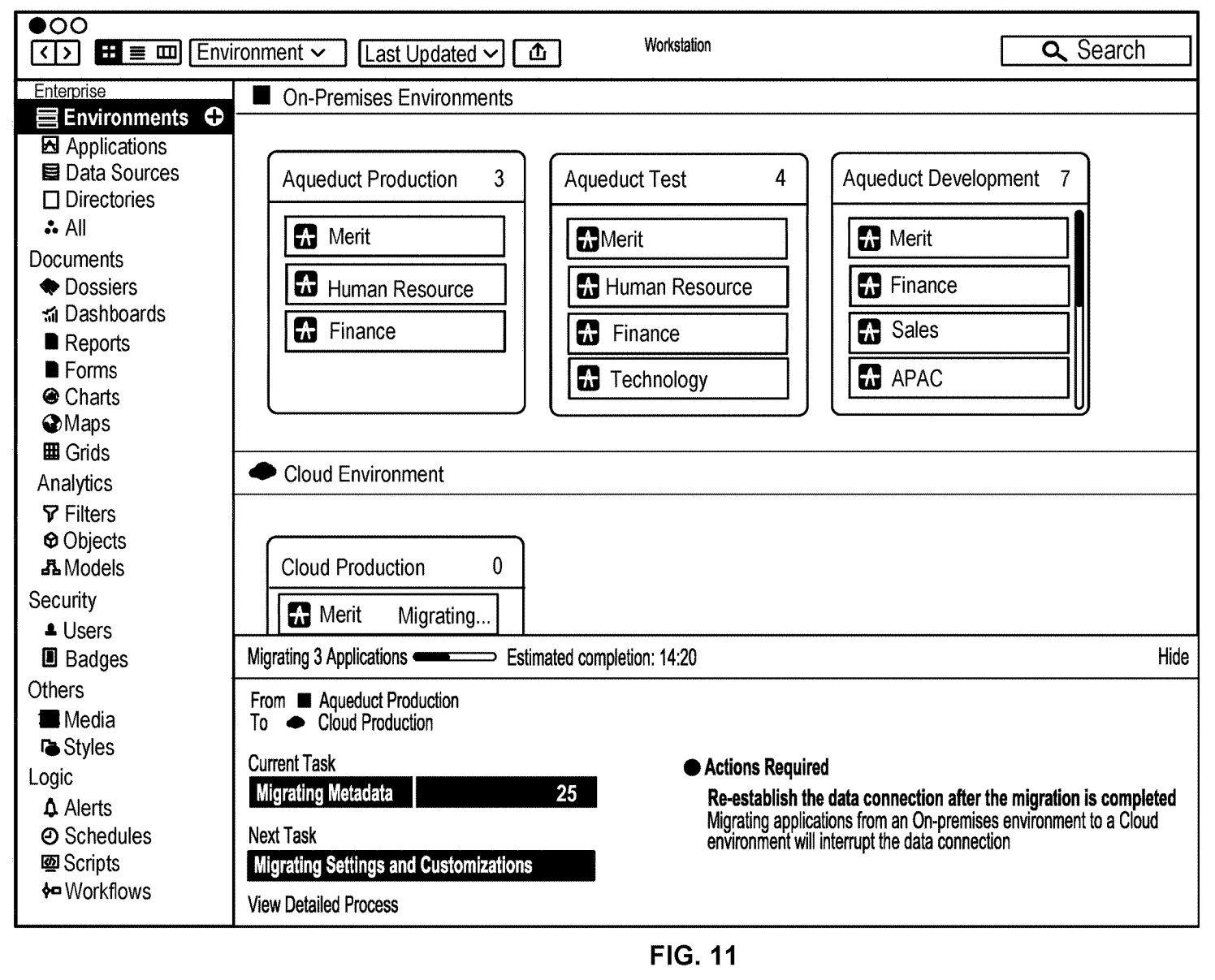

FIG. 11 is an exemplary illustration of a tasks and status indicator for the drag-drop operation to drop the application objects in a cloud-based "Cloud Production" environment. For example, the GUI displays status indicators that identify a source of the data objects being manipulated, a destination of the data objects being manipulated, current tasks being performed, a next task to be performed, and any additional actions required. It should be understood that the displayed status indicators are exemplary, and various other suitable status and tasks indicator may be provided.

After data migration for the "Cloud Production" environment is complete, a user may select the "Cloud Production" environment by clicking on the displayed representation of the "Cloud Production" environment to view a profile of the "Cloud Production" environment. As shown in FIG. 12, the "Cloud Production" environment profile includes information that identifies machines and applications operating in the "Cloud Production" environment, and respective characteristics (e.g., address, CPU usage, memory usage, disk usage) of the identified machines and applications.

In some implementations, a user or system administrator may want to restrict access of particular users to particular categories, platforms, environments, or sub-categories. Accordingly, the GUI provides a tool for selecting one or more categories, platforms, environments, or sub-categories and fencing users within the one or more categories, platforms, environments, or sub-categories.

Figure 14:
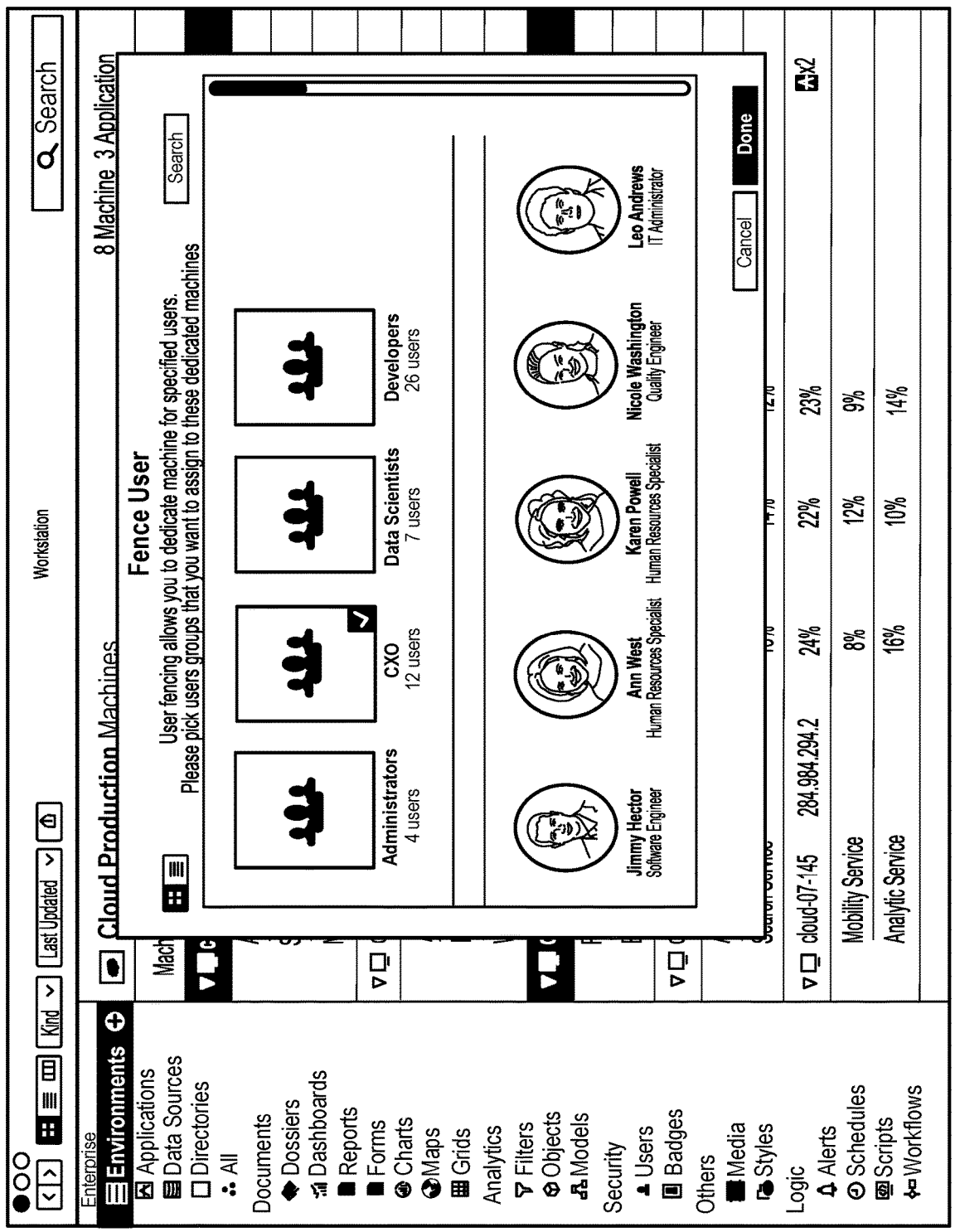
FIG. 14 is an exemplary illustration of an operation to fence users.

For instance, as shown in the example illustrated in FIG. 13, the user has selected two machines and a menu option to fence users for these two machines. In response to selection of the menu options, a new window providing data on users and user groups is displayed, as shown in FIG. 14. The user or system administrator may then select a user group (e.g., "CXO") or one or more users, who will be restricted to accessing just the two machines. After selecting the users or user groups, the profile of the environment is updated to reflect the fenced in users. For example, in FIG. 15, the "Cloud Production" environment has been updated to reflect that users in the "CXO group" have been fenced into machines "cloud-07-134" and "cloud-07-138."

In some implementations, users are fenced to particular machines or environments to ensure performance targets are met. For example, the CTO of a company may be assigned or "pinned" to a particularly reliable machine that is only used by him so that his requested reports on productivity for the entire enterprise system are generated quickly, research and development employees running resource-intensive simulations can be pinned to separate, different servers so that if one simulation crashes, it doesn't affect the other simulations.

As noted above, a simply process such as a drag-and-drop move of a server-hosted document or application may initiate a number of migration actions. These actions may be performed automatically in response to the user's confirmation for the change in serving the object, without further input from the user. As a few examples of the actions that may be performed to migrate an object, a server may: analyze required resources for the application move and advise on possible outcome; migrate metadata; migrate object definitions; migrate data source connections; migrate object dependencies; migrate users, user groups, and user directories; migrate environment and application settings; intelligently merge server-level settings (e.g., governing limits) or flag when destination limits may cause reduced application performance; migrate customizations; migrate enterprise assets; migrate the security layer (access control list, privileges, and permissions); and/or provide notifications/migration messaging.

According to the implementations described hereinabove, an improved method for manipulating data across a unified, multi-platform enterprise system is described. The described GUI provides a simple, easy-to-use interface with the unified, multi-platform enterprise system. Operations such as drag-drop or copy-paste may be executed using tools on the front end of the graphical user interface. However, on the back-end, various operations, such as object asset identification, acquisition, and manipulation, may be performed to ensure that data objects that are manipulated may operate across multiple platforms, environments, and categories. Although the implementations noted above have been described with respect to a unified, multi-platform enterprise system, it should be understood that these implementations may also be applied and utilized across various other types of networks and systems, such as an ad-hoc network with multiple user devices and platforms.

Because the management server 160 provides management functionality that is integrated with the information technology infrastructure of an enterprise, the management server 160 has access to user data as well as performance data for all environments, applications, and machines within the infrastructure. This provides a unique method of migration and performance monitoring of particular components within the infrastructure. For example, the management server 160 can determine that application performance is suffering for a particular user because available memory is low for the virtual machine associated with the user. The system is able to provide actual data for particular use cases.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The communication network may include one or more networks that provide network access, data transport, and other services to and from a user device. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wi-Fi architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The one or more networks may include one or more of databases, access points, servers, storage systems, cloud systems, and modules. For instance, the one or more networks may include at least one server, which may include any suitable computing device coupled to the one or more networks, including but not limited to a personal computer, a server computer, a series of server computers, a mini computer, and a mainframe computer, or combinations thereof. The at least one server may be a web server (or a series of servers) running a network operating system, examples of which may include but are not limited to Microsoft® Windows® Server, Novell® NetWare®, or Linux®. The at least one server may be used for and/or provide cloud and/or network computing. Although not shown in the figures, the server may have connections to external systems providing messaging functionality such as e-mail, SMS messaging, text messaging, and other functionalities, such as advertising services, search services, etc.

In some implementations, data may be sent and received using any technique for sending and receiving information including, but not limited to, using a scripting language, a remote procedure call, an email, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

The one or more databases may include various types of database, including a cloud database or a database managed by a database management system (DBMS). A DBMS may be implemented as an engine that controls organization, storage, management, and retrieval of data in a database. DBMSs may provide the ability to query, backup and replicate, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

The computing system may include clients, servers, and one or more user devices. A client and server are generally remote from each other and typically interact through a communication network. The relationship of client and server arises by virtue of computer programs running on the respective computers and having a client-server relationship to each other.

A user device may be any suitable electronic device such as a personal computer, a mobile telephone, a smart phone, a smart watch, a smart TV, a mobile audio or video player, a game console, or a combination of one or more of these devices. In general, the user device may be a wired or wireless device capable of browsing the Internet and providing a user with the GUI for manipulating data in the unified, multi-platform enterprise system.

The user device may include various components such as a memory, a processor, a display, and input/output units. The input/output units may include, for example, a transceiver which can communicate with the one or more networks to send and receive data. The display may be any suitable display including, for example, liquid crystal displays, light emitting diode displays. The display may display the GUI described above and shown in FIGS. 2-15.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A method performed by one or more computers, the method comprising:
   providing, by the one or more computers, a management interface configured to manage computer environments hosted by different server systems based on user input provided through the management interface, wherein the management interface identifies resources associated with a first computing environment hosted by a first server system;
   receiving, by the one or more computers, user input data indicating input provided through the management interface, wherein the input identifies a particular software resource provided by the first computing environment hosted by the first server system and instructs the particular software resource to be migrated to a second computing environment hosted by a second server system that is different from the first server system;
   in response to receiving the user input data:
      identifying, by the one or more computers, a difference in performance of the particular software resource between the first computing environment and the second computing environment;
      determining, by the one or more computers, that the identified difference in performance satisfies a threshold, wherein satisfying the threshold corresponds to a decrease in performance;
      in response to determining that the identified difference in performance satisfies the threshold, providing, by the one or more computers, an alert in the management interface, wherein the alert includes (i) user interface elements that indicate the identified difference in performance and (ii) interactive controls to enable a user to select whether to continue or cancel the migration of the particular software resource;
      migrating, by the one or more computers, the particular software resource to the second computing environment through communication with the second server system over a communication network to make the particular software resource executable in the second computing environment; and
      after migrating the particular software resource to the second computing environment, providing, by the one or more computers, data through the management interface indicating that the particular software resource is available through the second computing environment.

2. The method of claim 1, wherein the second server system is a cloud computing platform.

3. The method of claim 1, wherein the particular software resource is an application or service provided in the first computing environment, and wherein migrating the particular software resource comprises moving or copying the application or service to the second computing environment.

4. The method of claim 1, wherein migrating the particular software resource comprises causing an interactive document hosted in the first computing environment by the first server system to be hosted in the second computing environment by the second server system.

5. The method of claim 1, wherein migrating the particular software resource comprises causing functionality that the first computing environment provides for accessing a database to be provided by the second computing environment.

6. The method of claim 1, wherein the management interface comprises a user interface that identifies computing environments and hosted resources of an enterprise computing system across multiple server systems; and wherein the user interface providing interactive elements to (i) create and adjust computing environments on each of the multiple server systems, (ii) assign tasks or services among the computing environments, and (iii) assign users, tasks, or resources to the different computing environments.

7. The method of claim 1, further comprising:
before receiving the user input data, creating, by the one or more computers, the second computing environment on the second server system in response to input received through the management interface; and
after creating the second computing environment, providing a user interface element in the management interface that corresponds to the second computing environment and is interactive to enable applications or data objects to be assigned to be provided by the second computing environment.

8. The method of claim 1, comprising:
obtaining state information from the first computing environment; and
setting, in the second computing environment, the state indicated by the state information from the first computing environment.

9. The method of claim 1, comprising:
obtaining one or more configuration files from the first computing environment; and
merging the one or more configuration files with one or more configuration files of the second computing environment.

10. The method of claim 1, wherein migrating the particular software resource comprises migrating, from the first computing environment to the second computing environment, one or more of object definitions, data source connections, object dependencies, user assignments, user group assignments, environment and application settings, or security layer settings.

11. The method of claim 1, wherein identifying a difference in performance of the particular software resource between the first computing environment and the second computing environment comprises:
determining, by the one or more computers, a first performance measure indicating performance of the particular software resource in the first computing environment;
determining, by the one or more computers, a second performance measure indicating an estimate of performance of the particular software resource that would be provided in the second computing environment; and
identifying the difference in performance of the particular software resource between the first computing environment and the second computing environment based on the first performance measure and the second performance measure.

12. The method of claim 11, wherein the alert in the management interface is provided before migrating the particular software resource.

13. The method of claim 11, wherein the first performance measure and the second performance measure are measures of response time, reliability, user capacity, data processing speed, data processing capacity, available data storage security status, or network connectivity.

14. The method of claim 11, wherein migrating the particular software resource is performed based on determining (i) that the second performance measure satisfies a second threshold representing a minimum level of performance or (ii) that the identified difference in performance does not indicate a decrease in performance.

15. The method of claim 1, wherein the management interface comprises a user interface that has a first area corresponding to the first server system, the first area showing user interface elements representing one or more computing environments hosted by the first server system, and a second area corresponding to the second server system, the second area showing user interface elements representing one or more computing environments hosted by the second server system;
wherein the user interface shows a user interface element representing the particular software resource hosted by the first server system; and
wherein receiving the user input data indicating the input provided through the management interface comprises receiving user input data indicating an input that drags the user interface element representing the particular software resource to a user interface element in the second area of the user interface that represents the second computing environment.

16. The method of claim 1, comprising obtaining, by the one or more computers, configuration data for the particular software resource from the first server system;
wherein migrating the particular software resource includes applying the configuration data for the particular software resource obtained from the first server system in the second computing environment.

17. A server comprising:
one or more computers;
one or more computer-readable media storing instructions that are operable, when executed by the one or more computers, to cause the one or more computers to perform operations comprising:
providing, by the one or more computers, a management interface configured to manage computer environments hosted by different server systems based on user input provided through the management interface, wherein the management interface identifies resources associated with a first computing environment hosted by a first server system;
receiving, by the one or more computers, user input data indicating input provided through the management interface, wherein the input identifies a particular software resource provided by the first computing environment hosted by the first server system and instructs the particular software resource to be migrated to a second computing environment hosted by a second server system that is different from the first server system;
in response to receiving the user input data:
identifying, by the one or more computers, a difference in performance of the particular software resource between the first computing environment and the second computing environment;
determining, by the one or more computers, that the identified difference in performance satisfies a threshold, wherein satisfying the threshold corresponds to a decrease in performance;
in response to determining that the identified difference in performance satisfies the threshold, providing, by the one or more computers, an alert in the management interface, wherein the alert includes (i) user interface elements that indicate the identified difference in performance and (ii) interactive controls to enable a user to select whether to continue or cancel the migration of the particular software resource;

migrating, by the one or more computers, the particular software resource to the second computing environment through communication with the second server system over a communication network to make the particular software resource executable in the second computing environment; and after migrating the particular software resource to the second computing environment, providing, by the one or more computers, data through the management interface indicating that the particular software resource is available through the second computing environment.

18. The system of claim 17, wherein the second server system is a cloud computing platform.

19. The system of claim 17, wherein the particular software resource is an application or service provided in the first computing environment, and wherein migrating the particular software resource comprises moving or copying the application or service to the second computing environment.

20. One or more computer-readable media storing instructions that are operable, when executed by the one or more computers, to cause the one or more computers to perform operations comprising:

providing, by the one or more computers, a management interface configured to manage computer environments hosted by different server systems based on user input provided through the management interface, wherein the management interface identifies resources associated with a first computing environment hosted by a first server system;

receiving, by the one or more computers, user input data indicating input provided through the management interface, wherein the input identifies a particular software resource provided by the first computing environment hosted by the first server system and instructs the particular software resource to be migrated to a second computing environment hosted by a second server system that is different from the first server system;

in response to receiving the user input data:
identifying, by the one or more computers, a difference in performance of the particular software resource between the first computing environment and the second computing environment;

determining, by the one or more computers, that the identified difference in performance satisfies a threshold, wherein satisfying the threshold corresponds to a decrease in performance;

in response to determining that the identified difference in performance satisfies the threshold, providing, by the one or more computers, an alert in the management interface, wherein the alert includes (i) user interface elements that indicate the identified difference in performance and (ii) interactive controls to enable a user to select whether to continue or cancel the migration of the particular software resource;

migrating, by the one or more computers, the particular software resource to the second computing environment through communication with the second server system over a communication network to make the particular software resource executable in the second computing environment; and after migrating the particular software resource to the second computing environment, providing, by the one or more computers, data through the management interface indicating that the particular software resource is available through the second computing environment.

* * * * *